(12) United States Patent
Tsuchizawa et al.

(10) Patent No.: US 12,012,176 B2
(45) Date of Patent: Jun. 18, 2024

(54) BICYCLE CONTROL DEVICE

(71) Applicant: Shimano Inc., Osaka (JP)

(72) Inventors: Yasuhiro Tsuchizawa, Osaka (JP); Hiroshi Matsuda, Osaka (JP); Takuya Katsuki, Osaka (JP)

(73) Assignee: Shimano Inc., Osaka (JP)

( * ) Notice: Subject to any disclaimer, the term of this patent is extended or adjusted under 35 U.S.C. 154(b) by 646 days.

(21) Appl. No.: 17/208,557

(22) Filed: Mar. 22, 2021

(65) Prior Publication Data

US 2021/0206453 A1 Jul. 8, 2021

Related U.S. Application Data

(63) Continuation of application No. 15/935,852, filed on Mar. 26, 2018, now Pat. No. 10,988,205.

(30) Foreign Application Priority Data

Apr. 6, 2017 (JP) .................. 2017-076254

(51) Int. Cl.
*B62M 6/50* (2010.01)
*B62J 45/41* (2020.01)
*B62J 50/22* (2020.01)

(52) U.S. Cl.
CPC ............... *B62M 6/50* (2013.01); *B62J 45/41* (2020.02); *B62J 50/22* (2020.02)

(58) Field of Classification Search
CPC ..................................................... B62M 6/50
See application file for complete search history.

(56) References Cited

U.S. PATENT DOCUMENTS

| | | | |
|---|---|---|---|
| 9,573,646 B2 | 2/2017 | Lloyd et al. | |
| 9,802,447 B2 | 10/2017 | Petrucelli | |
| 10,152,875 B2 | 12/2018 | Khaligh et al. | |
| 10,988,205 B2 * | 4/2021 | Tsuchizawa | B62J 50/22 |
| 2015/0314656 A1 | 11/2015 | Reiss | |
| 2017/0295319 A1 | 10/2017 | Komemushi et al. | |
| 2017/0368894 A1 | 12/2017 | Kordes et al. | |

FOREIGN PATENT DOCUMENTS

| | | | | |
|---|---|---|---|---|
| CN | 1765692 A | * | 5/2006 | ............. B62M 6/45 |
| CN | 1765692 A | | 5/2006 | |
| CN | 201362143 Y | | 12/2009 | |
| CN | 103029790 A | | 4/2013 | |
| CN | 105270557 A | | 1/2016 | |
| CN | 106218327 A | | 12/2016 | |
| JP | 7-117423 A | | 5/1995 | |

(Continued)

*Primary Examiner* — Travis R Hunnings
(74) *Attorney, Agent, or Firm* — Global IP Counselors, LLP

(57) ABSTRACT

A bicycle control device includes an electronic controller and a gas pressure detection device. The electronic controller receives data indicative of a detected gas pressure of a tire provided to a bicycle. The tire is configured to maintain a gas in a compressed state. The gas pressure detection device is directly attached to a valve of the tire. The gas pressure detection device includes a sensor and a wireless communication device. The sensor detects the gas pressure of the tire. The wireless communication device is configured to perform wireless communication with the electronic controller.

8 Claims, 16 Drawing Sheets

(56) References Cited

FOREIGN PATENT DOCUMENTS

| | | |
|---|---|---|
| JP | 11-171081 A | 6/1999 |
| JP | 2008-44565 A | 2/2008 |
| JP | 4118984 B2 | 5/2008 |
| JP | 3167746 U | 4/2011 |
| JP | 2011-168241 A | 9/2011 |
| JP | 2013-211693 A | 10/2013 |
| JP | 2016-101761 A | 6/2016 |
| WO | 2013069300 A1 | 5/2013 |

* cited by examiner

BICYCLE CONTROL DEVICE

CROSS-REFERENCE TO RELATED APPLICATIONS

This application is a continuation application of U.S. patent application Ser. No. 15/935,852, filed on Mar. 26, 2018. This application claims priority to Japanese Patent Application No. 2017-076254, filed on Apr. 6, 2017. The entire disclosures of U.S. patent application Ser. No. 15/935,852 and Japanese Patent Application No. 2017-076254 are hereby incorporated herein by reference.

BACKGROUND

Field of the Invention

The present invention generally relates to a bicycle control device.

Background Information

A bicycle component that includes a gas chamber, which is configured to maintain gas in a compressed state, is known in the prior art. The bicycle component includes a tire, which is, for example, described in Japanese Laid-Open Patent Publication No. 7-117423 (patent document 1).

SUMMARY

Patent document 1 only describes the detection of the air pressure of the tire and the calculation of the distribution of weight applied to the vehicle based on the detected air pressure. One object of the present invention is to provide a bicycle control device that improves the control of an electric component provided to a bicycle.

In accordance with a first aspect of the present invention, a bicycle control device includes an electronic controller and a gas pressure detection device. The electronic controller receives data indicative of a detected gas pressure of a tire provided to a bicycle. The tire is configured to maintain a gas in a compressed state. The gas pressure detection device is directly attached to a valve of the tire. The gas pressure detection device includes a sensor and a wireless communication device. The sensor detects the gas pressure of the tire. The wireless communication device is configured to perform wireless communication with the electronic controller. With the bicycle control device according to the first aspect, the accuracy of the detected gas pressure of the tire of the bicycle is improved.

In accordance with a second aspect of the present invention, the bicycle control device according to the first aspect is configured so that the gas pressure detection device includes a battery to power the sensor and the wireless communication device. With the bicycle control device according to the second aspect, the operability of the gas protection device is improved.

In accordance with a third aspect of the present invention, the bicycle control device according to the first aspect is configured so that the gas pressure detection device is spaced radially outward from a rotational axis of the tire. With the bicycle control device according to the third aspect, the positioning of the gas pressure detection device is improved.

In accordance with a fourth aspect of the present invention, the bicycle control device according to the first aspect is configured so that the tire includes a gas chamber configured to maintain the gas in the compressed state, and the sensor is in direct fluid communication with the gas chamber. With the bicycle control device according to the fourth aspect, the accuracy of the detected gas pressure of the tire of the bicycle is improved.

In accordance with a fifth aspect of the present invention, a bicycle control device includes an electronic controller, a sensor and a wireless communication device. The electronic controller receives data indicative of a detected gas pressure of a tire provided to a bicycle. The tire is configured to maintain a gas in a compressed state. The sensor detects the gas pressure of the tire. The wireless communication device is disposed in the vicinity of a rim of the tire and is configured to perform wireless communication with the electronic controller. The sensor is configured to output a first signal corresponding to a detected gas pressure to the wireless communication device. The wireless communication device is configured to output a second signal to the electronic controller corresponding to the detected gas pressure. With the bicycle control device according to the fifth aspect, the positioning and operability of the bicycle control device is improved.

In accordance with a sixth aspect of the present invention, the bicycle control device according to the fifth aspect is configured so that the wireless communication device is disposed closer to the rim of the tire than to a rotation axis of the tire. With the bicycle control device according to the sixth aspect, the positioning of the wireless communication device is improved.

In accordance with a seventh aspect of the present invention, the bicycle control device according to the fifth aspect is configured so that the sensor is directly attached to a valve of the tire. With the bicycle control device according to the seventh aspect, the accuracy of the detected gas pressure of the tire of the bicycle is improved.

In accordance with an eighth aspect of the present invention, the bicycle control device according to the fifth aspect is configured so that the wireless communication device is spaced radially outward from a rotational axis of the tire. With the bicycle control device according to the eighth aspect, the positioning of the wireless communication device is improved.

In accordance with a ninth aspect of the present invention, the bicycle control device according to the fifth aspect is configured so that the tire includes a gas chamber configured to maintain the gas in the compressed state, and the sensor is in direct fluid communication with the gas chamber. With the bicycle control device according to the ninth aspect, the accuracy of the detected gas pressure of the tire is improved.

In accordance with a tenth aspect of the present invention, the bicycle control device includes an electronic controller, a sensor and a wireless communication device. The electronic controller receives data indicative of a detected gas pressure of a gas chamber of a bicycle component provided to a bicycle. The gas chamber of the bicycle component is configured to maintain a gas in a compressed state. The sensor detects the gas pressure of the bicycle component. The wireless communication device is configured to perform wireless communication with the electronic controller. The sensor is configured to output a first signal corresponding to a detected gas pressure to the wireless communication device. The wireless communication device is configured to output a second signal to the electronic controller corresponding to the detected gas pressure. The bicycle component includes at least one of a suspension and an adjustable seatpost. With the bicycle control device according to the tenth aspect, the gas pressure detection device can appropriately detect the gas pressure of the tire.

The bicycle control device of the present invention improves the controls of the bicycle components.

BRIEF DESCRIPTION OF THE DRAWINGS

Referring now to the attached drawings which form a part of this original disclosure.

DETAILED DESCRIPTION OF EMBODIMENTS

Selected embodiments will now be explained with reference to the drawings. It will be apparent to those skilled in the bicycle field from this disclosure that the following descriptions of the embodiments are provided for illustration only and not for the purpose of limiting the invention as defined by the appended claims and their equivalents.

First Embodiment

A bicycle 10 including a first embodiment of a bicycle control device 70 will now be described with reference to FIG. 1. The bicycle 10 is a mountain bike. However, certain aspects of the present invention is also applicable to a bicycle other than a mountain bike, for example, a road bike or a city bike.

Figure 1:
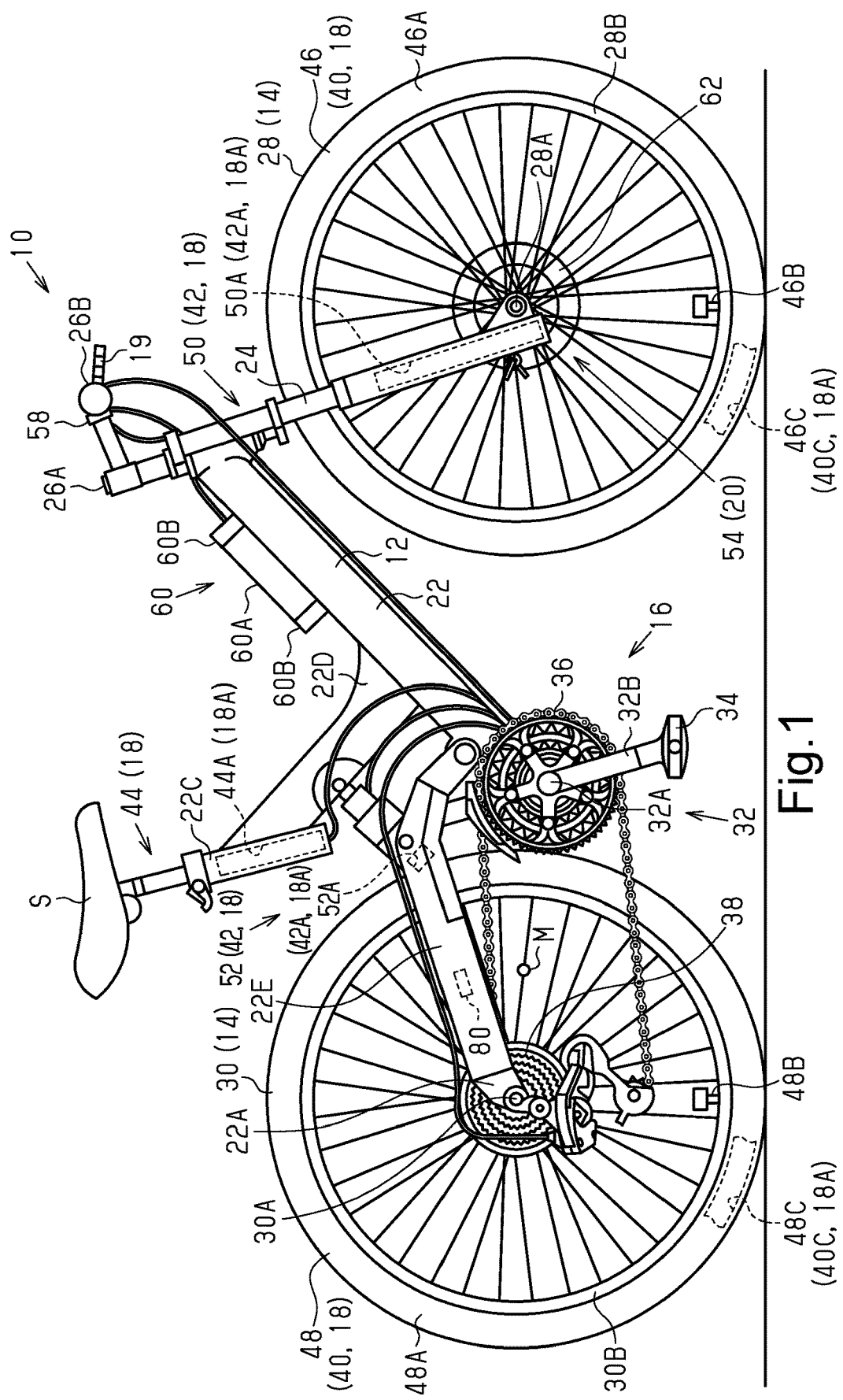
FIG. 1 is a side elevational view in accordance with a bicycle including a bicycle control device in accordance with a first embodiment.

As shown in FIG. 1, the bicycle 10 includes a bicycle main body 12, a pair of wheels 14, a drive mechanism 16, an electric component 20 and the bicycle control device 70. The bicycle main body 12 includes a frame 22, a front fork 24 connected to the frame 22, and a handlebar 26B removably coupled to the front fork 24 by a stem 26A. The front fork 24 is supported by the frame 22.

The wheels 14 include a front wheel 28 and a rear wheel 30. The front wheel 28 includes an axle 28A, which is connected to the front fork 24. The rear wheel 30 includes an axle 30A, which is connected to a rear end 22A of the frame 22.

The drive mechanism 16 includes a crank 32 and a pair of pedals 34. The crank 32 includes a crankshaft 32A and a pair of crank arms 32B. The drive mechanism 16 transmits manual driving force, which is applied to the pedals 34, to the rear wheel 30. The drive mechanism 16 includes a front rotary body 36, which is coupled to the crankshaft 32A or the crank arms 32B. The front rotary body 36 includes a sprocket, a pulley, or a bevel gear. The drive mechanism 16 is configured to transmit rotation of the crank 32 to a rear rotary body 38, which is coupled to the rear wheel 30, by, for example, a chain, a belt, or a shaft. The rear rotary body 38 includes a sprocket, a pulley, or a bevel gear. A one-way clutch is provided between the rear rotary body 38 and the rear wheel 30. The one-way clutch is configured to allow for forward rotation of the rear wheel 30 in a case where the rear rotary body 38 is rotated forward. The one-way clutch is further configured to prohibit rearward rotation of the rear rotary body 38 in a case where the rear wheel 30 is rotated rearward. The front rotary body 36 can include a plurality of front sprockets. The rear rotary body 38 can include a plurality of rear sprockets.

The bicycle 10 includes a bicycle component 18. The bicycle component 18 includes at least one of a tire 40, a suspension 42 and an adjustable seatpost 44. The bicycle component 18 includes a gas chamber 18A, which is configured to maintain gas in a compressed state. The tire 40, the suspension 42 and the adjustable seatpost 44 each include the gas chamber 18A. To distinguish the gas chambers 18A of the tire 40, the suspension 42, and the adjustable seatpost 44 from each other, the gas chamber 18A of the tire 40 is referred to as a gas chamber 40C, the gas chamber 18A of the suspension 42 is referred to as a gas chamber 42A, and the gas chamber 18A of the adjustable seatpost 44 is referred to as a gas chamber 44A.

The bicycle component 18 includes the tire 40. The tire 40 includes the front tire 46 and the rear tire 48. The front tire 46 and the rear tire 48 each include the gas chamber 40C. To distinguish the gas chambers 40C of the front tire 46 and the rear tire 48 from each other, the gas chamber 40C of the front tire 46 is referred to as a gas chamber 46C, and the gas chamber 40C of the rear tire 48 is referred to as a gas chamber 48C. The front tire 46 is attached to a rim 28B of the front wheel 28. The front tire 46 includes a tube 46A and a valve 46B, from which gas is injected into the tube 46A. The gas chamber 46C of the front tire 46 is formed in the tube 46A. The rear tire 48 is attached to a rim 30B of the rear wheel 30. The rear tire 48 includes a tube 48A and a valve 48B, from which air is injected into the tube 48A. The gas chamber 48C of the rear tire 48 is formed in the tube 48A. The front tire 46 and the rear tire 48 can each include a tubeless tire. In a case where the front tire 46 includes a tubeless tire, the tube 46A is omitted and the gas chamber 46C of the front tire 46 is defined by the front tire 46 and the rim 28B. In a case where the rear tire 48 includes a tubeless tire, the tube 48A is omitted and the gas chamber 48C of the rear tire 48 is defined by the rear tire 48 and the rim 30B.

The suspension 42 includes a front suspension 50 and a rear suspension 52. The front suspension 50 and the rear suspension 52 each include the gas chamber 42A. To distinguish the gas chambers 42A of the front suspension 50 and the rear suspension 52 from each other, the gas chamber 42A of the front suspension 50 is referred to as a gas chamber 50A, and the gas chamber 42A of the rear suspension 52 is referred to as a gas chamber 52A. The front suspension 50 is provided on the front fork 24. The front suspension 50 includes the gas chamber 50A. The front suspension 50 adjusts the hardness of the front suspension 50 by drawing gas into the gas chamber 50A or discharging gas out of the gas chamber 50A. The frame 22 includes a main frame 22D and a swingarm 22E. The main frame 22D supports the front fork 24 and a seatpost 22C. The swingarm 22E is rotatably coupled to the main frame 22D. The swingarm 22E has a rear end 22A, which supports the rear wheel 30. The rear suspension 52 is provided between the main frame 22D and the swingarm 22E. The rear suspension 52 is coupled to the main frame 22D and the swingarm 22E. The rear suspension 52 includes the gas chamber 52A. The rear suspension 52 adjusts the hardness of the rear suspension 52 by drawing air into the gas chamber 52A or discharging air out of the gas chamber 52A. The specific mechanisms of the front suspension 50 and the rear suspension 52 are the same as that of a typical suspension. Thus, the mechanisms of the front suspension 50 and the rear suspension 52 will not be described in detail.

The adjustable seatpost 44 is provided on the main frame 22D of the frame 22. The adjustable seatpost 44 includes the gas chamber 44A. The adjustable seatpost 44 adjusts the length of the adjustable seatpost 44 by drawing air into the gas chamber 44A or discharging air out of the gas chamber 44A. The adjustable seatpost 44 supports a saddle S. The adjustable seatpost 44 is configured to adjust the height of the saddle S with respect to the main frame 22D. The specific mechanism of the adjustable seatpost 44 is the same as that of a typical adjustable seatpost. Thus, the mechanism of the adjustable seatpost 44 will not be described in detail.

The bicycle 10 further includes a brake device (not shown), a brake operating device 19, a shifting device and a shift operating device. The brake device (not shown), is provided on the frame 22 to apply the brakes on the wheels 14 in accordance with an operation of the brake operating device 19. The brake operating device 19 is provided on the handlebar 26B. The brake device can include a disc brake device. Alternatively, the brake device can include a caliper brake device. The brake device and the brake operating device 19 are provided in correspondence with each of the front wheel 28 and the rear wheel 30. The specific mechanisms of the brake device and the brake operating device 19 are the same as that of a typical brake device and a typical brake operating device. Thus, the mechanisms of the brake device and the brake operating device 19 will not be described in detail. The shifting device is provided on the frame 22 to change the transmission ratio of the bicycle 10 in accordance with an operation of the shift operating device. The shift operating device is provided on the handlebar 26B. The shifting device can include a derailleur. Alternatively, the shifting device can include an internal shifting device. The derailleur includes at least one of a front derailleur and a rear derailleur. The specific mechanisms of the shifting device and the shift operating device are the same as that of a typical shifting device. Thus, the mechanisms of the shifting device and the shift operating device will not be described in detail.

Figure 2:
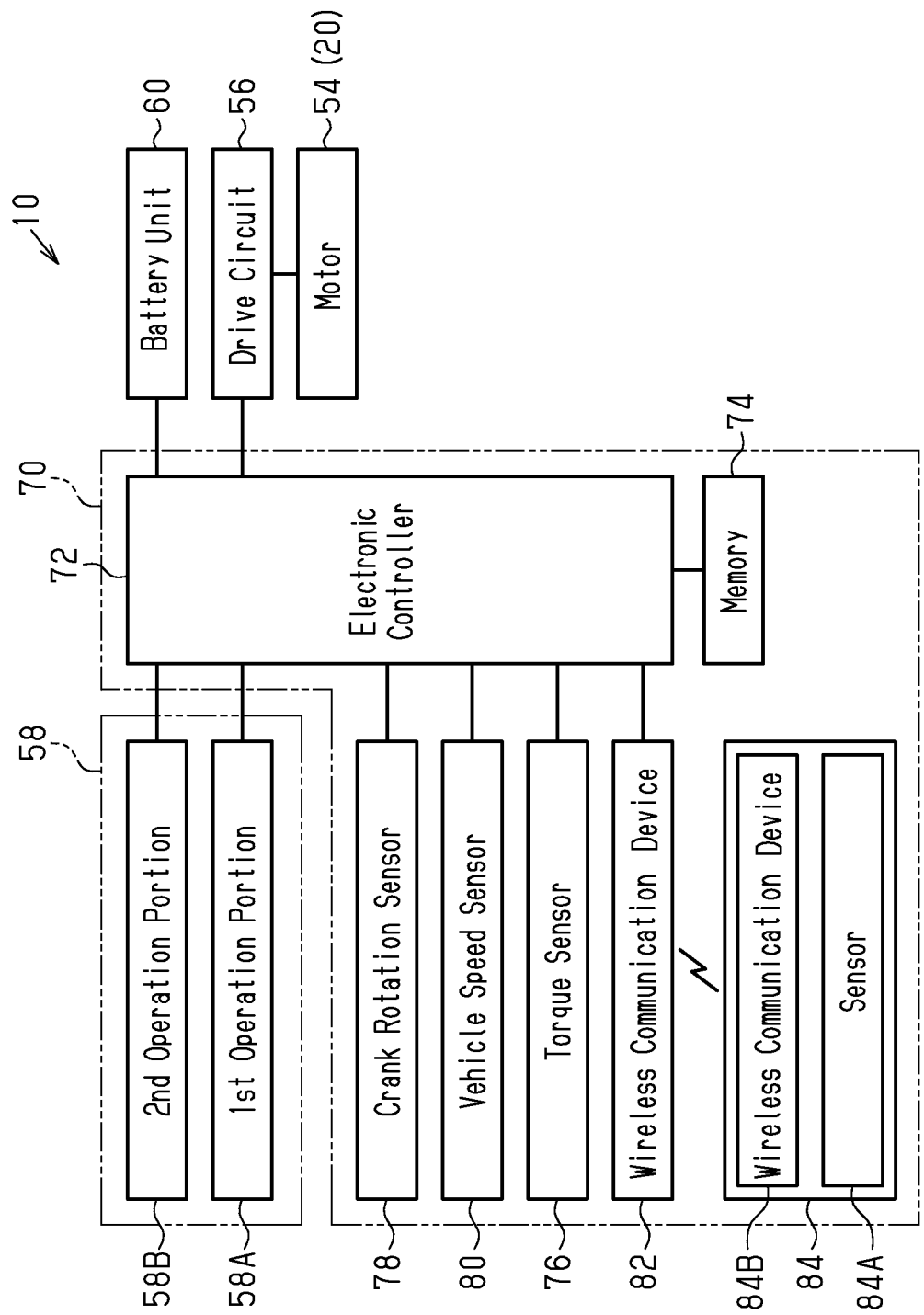
FIG. 2 is a block diagram in accordance with the electric configuration of the bicycle control device of FIG. 1.

As shown in FIG. 2, the electric component 20 includes an electric motor 54. The bicycle 10 further includes a drive circuit 56 of the motor 54, an user actuator 58 and a battery unit 60. Here, the electric component 20 is a motorized front hub that assists in propulsion of the bicycle 10. However, the electric component 20 can be a drive assist unit that is mounted in another location on the bicycle 10 to assist in propulsion of the bicycle 10. Alternatively, the electric component 20 can be an adjustable bicycle component that has an electric motor, and that is desirable to be adjusted based on the pressure of the front tire 46 and/or the rear tire 48.

The motor 54 and the drive circuit 56 are provided in a common housing 62 (refer to FIG. 1). The drive circuit 56 controls electric power that is supplied from the battery unit 60 to the motor 54. The motor 54 assists in propulsion of the bicycle 10. The motor 54 transmits torque to at least the front wheel 28, which is shown in FIG. 1. The motor 54 is provided in the vicinity of the axle 28A of the front wheel 28. A one-way clutch can be provided between an output portion of the motor 54 and the front wheel 28. The one-way clutch is provided to prohibit rotation of the motor 54 in a case the front wheel 28 is rotated in a direction in which the bicycle 10 travels rearward. In the present embodiment, the front wheel 28 includes a hub shell, which is formed integrally with the housing 62. The drive circuit 56 can be separate from the housing 62 and provided on the frame 22. The motor 54 forms a front hub motor together with a hub of the front wheel 28. The specific mechanism of the front hub motor is the same as that of a typical front hub motor. Thus, the mechanism of the front hub motor will not be described in detail.

The user actuator 58 is operable by the rider. The user actuator 58 is coupled to the handlebar 26B of the bicycle 10. The user actuator 58 is configured to communicate with an electronic controller 72 of the bicycle control device 70, which is shown in FIG. 2. The user actuator 58 is connected to the electronic controller 72 so as to perform wired or wireless communications with the electronic controller 72. The user actuator 58 is communicable with the electronic controller 72, for example, through a power line communication (PLC). In accordance with an operation performed on the user actuator 58 by the rider, the user actuator 58 transmits an output signal to the electronic controller 72. The user actuator 58 includes a first operation portion 58A and a second operation portion 58B. The first operation portion 58A and the second operation portion 58B are operated to change an assist mode of the motor 54. Each of the first operation portion 58A and the second operation portion 58B of the operation portion 58 includes, for example, a user operation or input member, a sensor that detects movement of the user operation or input member, and an electric circuit that communicates with the electronic controller 72 in accordance with an output signal of the sensor (not shown).

As shown in FIG. 1, the battery unit 60 includes a battery 60A and a battery holder 60B. The battery 60A includes one or more battery cells. The battery holder 60B holds the battery 60A. A battery cell includes a rechargeable battery. The battery unit 60 is provided on the bicycle 10 to supply electric power to other electric components electrically connected to the battery 60A by wires, which are, for example, the motor 54 and the bicycle control device 70.

As shown in FIG. 2, the bicycle control device 70 includes the electronic controller 72. In one example, the bicycle control device 70 further includes a memory 74, a torque sensor 76, a crank rotation sensor 78, a vehicle speed sensor 80, a wireless communication device 82 and a gas pressure detection device 84. The term "wireless communication device" as used herein includes a receiver, a transmitter, a transceiver, a transmitter-receiver, and contemplates any device or devices, separate or combined, capable of transmitting and/or receiving wireless communication signals, including shift signals or control, command or other signals related to some function of the component being controlled. The wireless communication signals can be radio frequency (RF) signals, ultra-wide band communication signals, or Bluetooth communications or any other type of signal suitable for wireless communications as understood in the bicycle field. Here, the wireless communication device 82 can be a one-way wireless communication device such as a receiver.

The torque sensor 76 outputs a signal corresponding to a detected manual driving force. The torque sensor 76 detects a manual driving force TA, which is input to the drive mechanism 16 via the pedals 34. The torque sensor 76 can be provided in a transmission path of the manual driving force TA extending from the crankshaft 32A to the front rotary body 36. Alternatively, the torque sensor 76 can be provided on one of the crankshaft 32A, the front rotary body 36, the crank arms 32B and the pedals 34. The torque sensor 76 can be realized by, for example, a strain sensor, a magnetostriction sensor, an optical sensor, or a pressure sensor. Any sensor can be used as long as the sensor outputs a signal that corresponds to the manual driving force TA, which is applied to the crank arms 32B or the pedals 34.

The crank rotation sensor 78 detects a rotational angle CA of the crank 32. The crank rotation sensor 78 is attached to the frame 22 of the bicycle 10 or the housing 62 of the motor 54. The crank rotation sensor 78 includes a magnetic sensor that outputs a signal corresponding to the strength of a magnetic field. The magnetic sensor is provided on the crankshaft 32A coaxially with the crankshaft 32A to detect an annular magnet, which produces a magnetic field that changes in strength in the circumferential direction. In the case of using a magnetic sensor that outputs a signal corresponding to the strength of a magnetic field, a rotational speed N of the crank 32 and a rotational angle of the crank 32 can be detected with the single sensor. This simplifies the structure and facilitates the assembling. The crank rotation sensor 78 detects at least one of the rotational angle CA of the crank 32 and the rotational speed of the crank 32.

The vehicle speed sensor 80 detects a rotational speed of the wheels 14. The vehicle speed sensor 80 is electrically connected to the electronic controller 72 by a wire or without using a wire. As shown in FIG. 1, the vehicle speed sensor 80 is attached to a chainstay of the frame 22. The vehicle speed sensor 80 outputs a signal to the electronic controller 72 in accordance with a change in the position of the vehicle speed sensor 80 relative to a magnet M, which is attached to the rear wheel 30. Preferably, the vehicle speed sensor 80 includes a magnetic reed, which forms a reed switch, or a Hall sensor.

Figure 3:
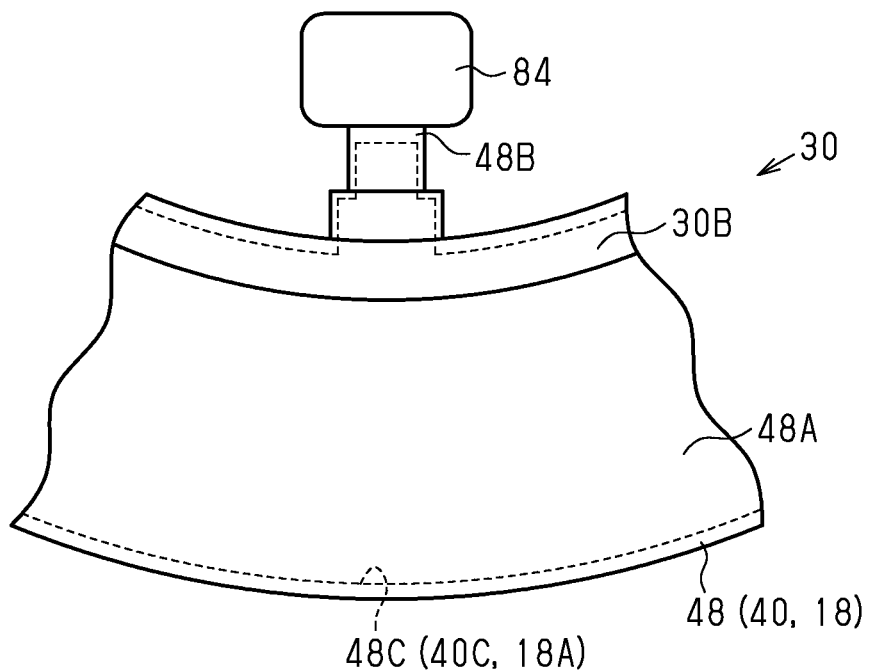
FIG. 3 is a partially enlarged side view in accordance with a bicycle component of FIG. 1.

The gas pressure detection device 84 detects a gas pressure P of the gas chamber 18A of the bicycle component 18, which is shown in FIG. 1. The gas pressure detection device 84 detects the gas pressure P of the gas chamber 48C of the rear tire 48. As shown in FIG. 3, the gas pressure detection device 84 is attached to the valve 48B of the tire 40. The gas pressure detection device 84 is configured to perform wireless communications with the electronic controller 72, which is shown in FIG. 2. The gas pressure detection device 84 includes a sensor 84A and a wireless communication device 84B. The sensor 84A outputs a signal corresponding to the gas pressure P (i.e., the detected gas pressure) to the wireless communication device 84B. Here, the wireless communication device 84B can be a one-way wireless communication device such as a transmitter. The wireless communication device 84B transmits the output of the sensor 84A through wireless communications to the electronic controller 72. The wireless communication device 82 performs wireless communications with the wireless communication device 84B of the gas pressure detection device 84. The wireless communication device 82 processes the signal received from the gas pressure detection device 84 and outputs the signal to the electronic controller 72. The gas pressure detection device 84 can be coupled to the valve 46B of the front tire 46 instead of the valve 48B of the rear tire 48 to detect gas pressure of the gas chamber 46C of the front tire 46. The sensor 84A includes, for example, a pressure sensor. The sensor 84A can include a different sensor as long as gas pressure is detectable. Preferably, the gas pressure detection device 84 further includes a battery that supplies electric power to the sensor 84A and the wireless communication device 84B.

The electronic controller 72 includes an arithmetic processing unit that executes predetermined control programs. The arithmetic processing unit includes, for example, a central processing unit (CPU) or a micro processing unit (MPU) having at least one processor. The electronic controller 72 can include one or more microcomputers having a processor. The electronic controller 72 further includes a timer. The memory 74 is any computer memory (storage) device or any computer readable medium with the sole exception of a transitory, propagating signal. The memory 74 stores information used in various kinds of control programs and various kinds of control processes. The memory 74 includes, for example, a nonvolatile memory and a volatile memory, and can includes a ROM (Read Only Memory) device, a RAM (Random Access Memory) device, a hard disk, a flash drive, etc. The electronic controller 72 and the memory 74 are accommodated in, for example, the housing 62 (refer to FIG. 1). The electronic controller 72 and the memory 74 can be provided on the frame 22.

The electronic controller 72 calculates a vehicle speed V of the bicycle 10 based on outputs of the vehicle speed sensor 80. The electronic controller 72 controls the electric component 20, which is mounted on the bicycle 10. The electronic controller 72 controls the electric component 20 in accordance with the gas pressure P. The electronic controller 72 controls the motor 54 in accordance with the gas pressure P. The electronic controller 72 controls the motor 54 to change an output TX of the motor 54. The output TX of the motor 54 is expressed by output torque.

The electronic controller 72 controls the motor 54. In a case where the vehicle speed V of the bicycle 10 is less than or equal to a predetermined speed VX, the electronic controller 72 controls the motor 54 so that the motor 54 assists in propulsion of the bicycle 10. The electronic controller 72 is configured to control the motor 54 in an assist mode, which assists in propulsion of the bicycle 10 in accordance with the manual driving force TA that is input to the bicycle 10. The electronic controller 72 is configured to control the motor 54 in a walk mode, which assists in walking the bicycle 10. The electronic controller 72 switches between the assist mode and the walk mode in accordance with at least one of operations of the user actuator 58 and outputs of various kinds of sensors.

The predetermined speed VX includes a predetermined speed VX1 that is appropriate for the assist mode and a predetermined speed VX2 that is appropriate for the walk mode. In the assist mode, in a case where the vehicle speed V of the bicycle 10 is less than or equal to the predetermined speed VX1, the electronic controller 72 controls the motor 54 so that the motor 54 assists in propulsion of the bicycle 10. In one example, the predetermined speed VX1 is 25 km per hour. In the walk mode, in a case where the vehicle speed V of the bicycle 10 is less than or equal to the predetermined speed VX2, the electronic controller 72 controls the motor 54 so that the motor 54 assists in walking the bicycle 10.

In the assist mode, the electronic controller 72 drives the motor 54 in accordance with the manual driving force TA. The assist mode includes a plurality of assist modes, which differ from each other in the ratio of the output TX of the motor 54 to the manual driving force TA. The electronic controller 72 further includes an OFF mode, in which the motor 54 is not driven. In the description hereafter, the ratio of the output TX of the motor 54 to the manual driving force TA is referred to as "the assist ratio R." In a case where the output TX of the motor 54 is output via a reduction gear, the output of the reduction gear corresponds to the output TX of the motor 54. In a case where the first operation portion 58A of the user actuator 58 is operated while the motor 54 is in the OFF mode, the electronic controller 72 switches to the assist mode corresponding to the lowest of the assist ratios R. In a case where the first operation portion 58A of the user actuator 58 is operated while the motor 54 is in the assist mode, the electronic controller 72 switches to the mode in which the assist ratio R is one stage higher. In a case where the first operation portion 58A of the user actuator 58 is operated while the motor 54 is in the assist mode corresponding to the highest assist ratio R, the electronic controller 72 maintains the assist mode corresponding to the highest assist ratio R. In a case where the second operation portion 58B of the user actuator 58 is operated in the OFF mode, the electronic controller 72 switches from the assist mode to the walk mode. In a case where the second operation portion 58B of the user actuator 58 is operated in the assist mode, the electronic controller 72 switches to the mode in which the assist ratio R is one stage lower. In a case where the second operation portion 58B of the user actuator 58 is operated while the motor 54 is in the assist mode corresponding to the lowest assist ratio R, the electronic controller 72 switches to the OFF mode. The assist mode can include one assist mode and the OFF mode. Alternatively, the assist mode can include only one assist mode. In a case where the second operation portion 58B of the user actuator 58 is operated for a predetermined time or longer in the assist mode excluding the OFF mode, the electronic controller 72 can switch to the walk mode. A display (not shown) is provided on the handlebar 26B (refer to FIG. 1) to show the operation mode that is presently selected from the plurality of assist modes and the walk mode.

In the walk mode, the electronic controller 72 is configured to drive the motor 54 so that the motor 54 assists in walking the bicycle 10. The walk mode includes a wait mode, in which the motor 54 is not driven, and a drive mode, in which the motor 54 is driven. In a state where the manual driving force TA is not input to the crank 32 in the walk mode, the electronic controller 72 is configured to drive the motor 54. In a case where the electronic controller 72 switches from the assist mode to the walk mode, the mode is the wait mode. In a case where the second operation portion 58B is operated while the motor 54 is in the wait mode, the electronic controller 72 switches from the wait mode to the drive mode. In a case where the electronic controller 72 does not need to stop driving the motor 54 in accordance with inputs from various kinds of sensors or in a case where the first operation portion 58A is not operated, the electronic controller 72 maintains the drive mode to drive the motor 54 while the second operation portion 58B continues to be pressed in the walk mode. The various kinds of sensors include the vehicle speed sensor 80, the torque sensor 76, and the crank rotation sensor 78. In a state where the second operation portion 58B is operated to maintain the drive mode, the electronic controller 72 switches from the drive mode to the wait mode in a case where the operation of the second operation portion 58B is cancelled. In a state where the second operation portion 58B is operated to maintain the drive mode, the electronic controller 72 switches from the drive mode to the wait mode in a case where the driving of the motor 54 needs to be stopped in accordance with inputs of the various kinds of sensors or in a case where the first operation portion 58A is operated. In the case of switching from the drive mode to the wait mode in a state where the second operation portion 58B is operated, the electronic controller 72 is configured to again switch to the drive mode from the wait mode in a case where the operation of the second operation portion 58B is temporarily cancelled and then the second operation portion 58B is again operated. In the walk mode, the electronic controller 72 determines that the driving of the motor 54 needs to be stopped in a case where the vehicle speed V of the bicycle 10, which is detected by the vehicle speed sensor 80, exceeds the predetermined speed VX2. In the walk mode, the electronic controller 72 determines that the driving of the motor 54 needs to be stopped in a case where the manual driving force TA, which is detected by the torque sensor 76, becomes greater than or equal to a predetermined value. In the walk mode, the electronic controller 72 determines that the driving of the motor 54 needs to be stopped in a case where the crank rotation sensor 78 detects rotation of the crank 32. At least one of the control for stopping the driving of the motor 54 based on the manual driving force TA, which is detected by the torque sensor 76, and the control for stopping the driving of the motor 54 based on the rotation of the crank 32, which is detected by the crank rotation sensor 78, does not have to be performed in the walk mode. The operation portion 58 can include a walking operation portion that is separate from the first operation portion 58A. In this case, in a case where the walking operation portion is operated, the electronic controller 72 can be configured to drive the motor 54 while the walking operation portion is operated unless the driving of the motor 54 needs to be stopped in accordance with inputs of the various kinds of sensors.

Figure 4:
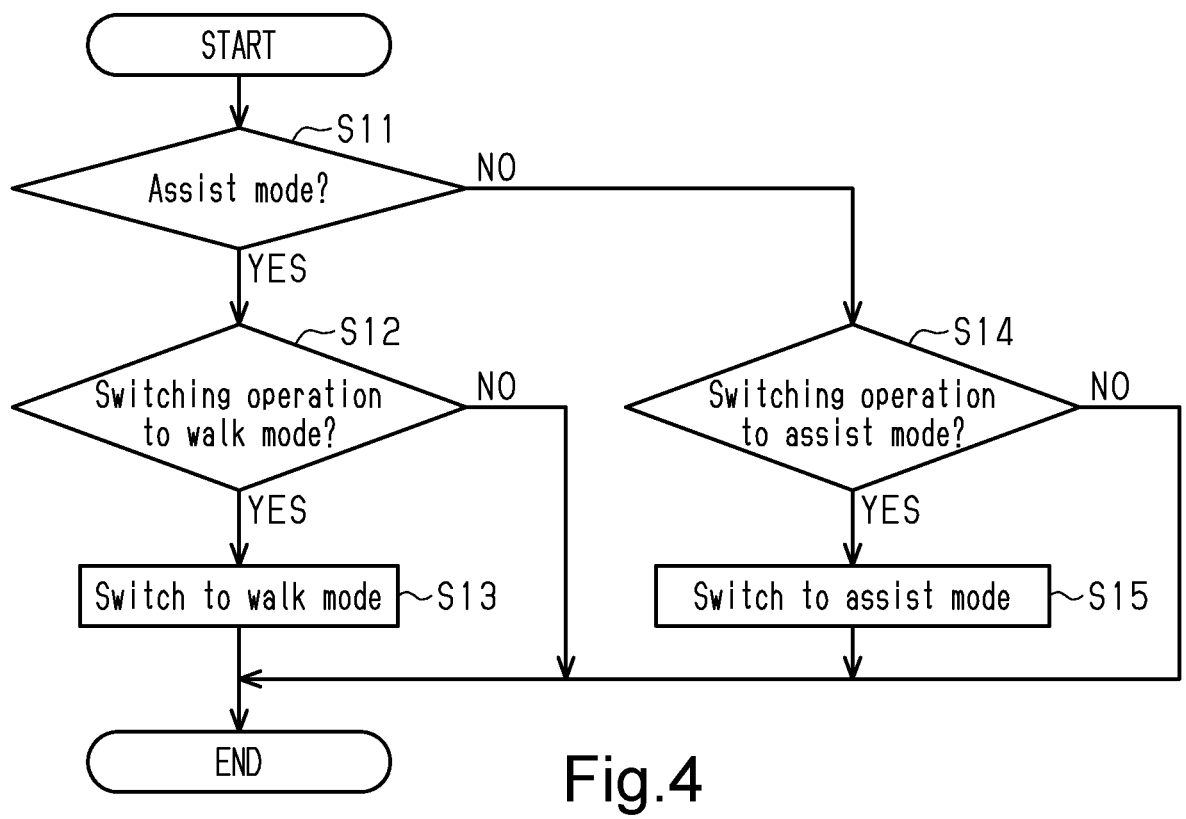
FIG. 4 is a flowchart in accordance with switching control executed by the electronic controller of FIG. 2.

The switching control for switching between the assist mode and the walk mode will now be described with reference to FIG. 4. The electronic controller 72 is configured to switch between the assist mode and the walk mode in a case where the first operation portion 58A or the second operation portion 58B is operated. In a case where the first operation portion 58A or the second operation portion 58B is operated, the electronic controller 72 starts the process and proceeds to step S11 of the flowchart, which is shown in FIG. 4.

In step S11, the electronic controller 72 determines whether or not the present mode is the assist mode. In a case where the electronic controller 72 determines that the present mode is the assist mode, the electronic controller 72 proceeds to step S12. In step S12, the electronic controller 72 determines whether or not an operation for switching to the walk mode is performed. More specifically, in a case where the second operation portion 58B of the user actuator 58 is operated in the OFF mode of the assist mode, the electronic controller 72 determines that the operation for switching to the walk mode is performed. The electronic controller 72 can determine that the operation for switching to the walk mode is performed in a case where the second operation portion 58B of the user actuator 58 is operated for a predetermined time or longer in the assist mode excluding the OFF mode.

In a case where the electronic controller 72 determines that the operation for switching to the walk mode is not performed, the electronic controller 72 ends the process. In a case where the electronic controller 72 determines that the operation for switching to the walk mode is performed, the electronic controller 72 proceeds to step S13 to switch from the assist mode to the walk mode and then ends the process.

In a case where the electronic controller 72 determines in step S11 that the present mode is not assist mode, that is, determines that the present mode is the walk mode, the electronic controller 72 proceeds to step S14 and determines whether or not an operation for switching to the assist mode is performed. More specifically, in a case where the first operation portion 58A of the user actuator 58 is operated in the wait mode of the walk mode, the electronic controller 72 determines that the operation for switching to the assist mode is performed. The electronic controller 72 can determine that the operation for switching to the assist mode is performed in a case where the first operation portion 58A of the user actuator 58 is operated for a predetermined time or longer in the wait mode of the walk mode. In a case where the electronic controller 72 determines that the operation for switching to the assist mode is not performed, the electronic controller 72 ends the process. In a case where the electronic controller 72 determines that the operation for switching to the assist mode is performed, the electronic controller 72 proceeds to step S15 to switch from the walk mode to the assist mode and then ends the process.

In the assist mode, the electronic controller 72 controls the motor 54 in accordance with the gas pressure P. In the assist mode, the electronic controller 72 changes at least one of the assist ratio R and the output TX of the motor 54 in accordance with the gas pressure P. The electronic controller 72 controls the motor 54 based on at least one of a map, a table, and a relational expression stored in the memory 74 specifying the relationship between the gas pressure P and the assist ratio R in the assist mode. The map, the table, and the relational expression can be provided for each mode of the assist modes having different assist ratios R. Alternatively, in a case where the memory 74 stores at least one of a map, a table, and a relational expression specifying the relationship between the gas pressure P and a correction coefficient, the output TX of the motor 54, which is calculated based on the manual driving force TA, can be corrected based on the correction coefficient.

Figure 5:
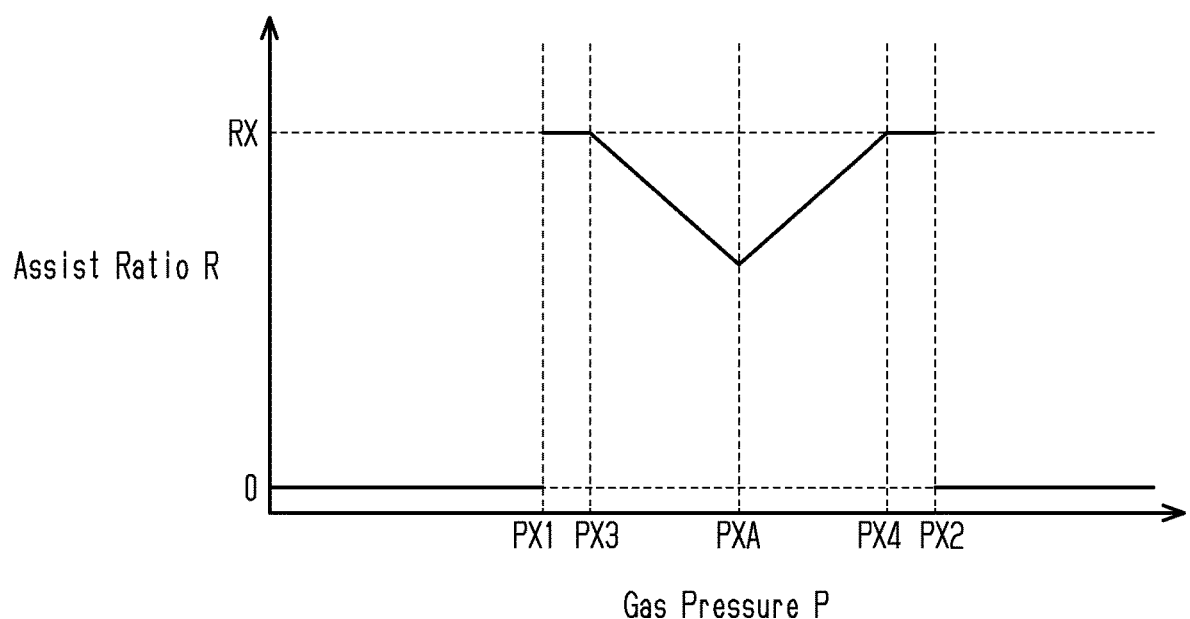
FIG. 5 is a first map specifying the relationship between gas pressure and the assist ratio stored in the memory of FIG. 2.

FIG. 5 shows a first map showing a first example of the relationship between the gas pressure P and the assist ratio R in the assist mode. In the first example, in a case where the gas pressure P is increased, the electronic controller 72 increases the assist ratio R. In a case where the gas pressure P is decreased, the electronic controller 72 increases the assist ratio R. The electronic controller 72 controls the motor 54 in accordance with a change amount from a reference value PXA. In a case where the gas pressure P is increased from the predetermined reference value PXA, the electronic controller 72 increases the assist ratio R compared to a case where the gas pressure P is the predetermined reference value PXA. In a case the gas pressure P is decreased from the predetermined reference value PXA, the electronic controller 72 increases the assist ratio R compared to a case where the gas pressure P is the predetermined reference value PXA. In a case where the gas pressure P is less than or equal to a first pressure PX1, the electronic controller 72 sets the output TX of the motor 54 to zero or stops the driving of the motor 54. In a case where the gas pressure P is less than or equal to the first pressure PX1, the electronic controller 72 sets the output TX of the motor 54 to zero or stops the driving of the motor 54, for example, by setting the assist ratio R to zero.

In a case where the gas pressure P is less than the reference value PXA, the electronic controller 72 increases the assist ratio R as the gas pressure P is decreased until the gas pressure P becomes a third pressure PX3, which is less than the reference value PXA and greater than the first pressure PX1. As the gas pressure P is decreased, the assist ratio R can be increased in a linear manner, a curvilinear manner, or a stepped manner in a range from the reference value PXA to the third pressure PX3. In a case where the gas pressure P is included in a range that is less than or equal to the third pressure PX3 and greater than the first pressure PX1, the electronic controller 72 sets the assist ratio R to a fixed value RX. In a case where the gas pressure P is greater than or equal to a second pressure PX2, which is greater than the first pressure PX1, the electronic controller 72 sets the output TX of the motor 54 to zero or stops the driving of the motor 54. In a case where the gas pressure P is greater than or equal to the second pressure PX2, the electronic controller 72 sets the output TX of the motor 54 to zero or stops the driving of the motor 54, for example, by setting the assist ratio R to zero.

In a case where the gas pressure P is greater than the reference value PXA, the electronic controller 72 increases the assist ratio R as the gas pressure P is increased until the gas pressure P reaches a fourth pressure PX4, which is greater than the reference value PXA and less than the second pressure PX2. As the gas pressure P is increased, the assist ratio R can be increased in a linear manner, a curvilinear manner, or a stepped manner in a range from the reference value PXA to the fourth pressure PX4. In a case where the gas pressure P is included in a range that is greater than or equal to the fourth pressure PX4 and less than the second pressure PX2, the electronic controller 72 sets the assist ratio R to the fixed value RX.

The predetermined reference value PXA, the first pressure PX1, the second pressure PX2, the third pressure PX3, and the fourth pressure PX4 are set based on, for example, the type, the thickness, and the diameter of the tire 40. For example, after the gas pressure P of the gas chamber 40C is adjusted to be in an appropriate range of the gas pressure P that is set for each tire 40, the reference value PXA corresponds to a value obtained in a state where the rider mounts the bicycle 10 and applies the entire weight to the bicycle 10. The memory 74 stores the predetermined reference value PXA, the first pressure PX1, the second pressure PX2, the third pressure PX3, and the fourth pressure PX4. The reference value PXA can be stored in the memory 74 by an operation performed by the user. Each value of the first pressure PX1, the second pressure PX2, the third pressure PX3, and the fourth pressure PX4 can be automatically changed in accordance with a change in the reference value PXA. Alternatively, each value of the first pressure PX1, the second pressure PX2, the third pressure PX3, and the fourth pressure PX4 can be stored in the memory 74 together with the reference value PXA. In a case where the reference value PXA is stored in the memory 74 in accordance with an operation performed by the user, the bicycle control device 70 includes, for example, an interface used for connection with an external device through wired or wireless communication. The external device is, for example, a personal computer, a tablet computer, a smartphone, or a cycle computer. The bicycle control device 70 is operated in a setting mode. If information for changing the reference value PXA is received from the external device in the setting mode, the electronic controller 72 changes the reference value PXA stored in the memory 74. The information for changing the reference value PXA can be information related to the value of the gas pressure P or information related to the weight of the rider. In a case where the reference value PXA is stored in the memory 74 in accordance with an operation performed by the user, the electronic controller 72 can store the reference value PXA in the memory 74, for example, in accordance with a signal obtained from the sensor 84A in accordance with a particular operation performed on the user actuator 58 by the rider, mounting the bicycle 10, after the gas pressure P of the gas chamber 18A is adjusted to be in the appropriate range of the gas pressure P set for each tire 40.

The operation of the case of controlling the motor 54 using the first map, which is shown in FIG. 5, will now be described. For example, in a case where the load mounted on the bicycle 10 is increased, the gas pressure P increases. Thus, in a case where the gas pressure P is increased from the reference value PXA, the electronic controller 72 increases the assist ratio R to reduce the load on the rider. In a case where the gas pressure P further increases and becomes greater than or equal to the second pressure PX2, the output TX of the motor 54 is set to zero or the driving of the motor 54 is stopped. Consequently, in a state where the gas pressure P is increased out of the appropriate range of the gas pressure P that is set for each tire 40, the motor 54 will not assist in propulsion of the bicycle 10. This avoids a situation in which a large load is applied to the tire 40.

In a case where the gas pressure P is decreased from the reference value PXA, the rolling resistance of the tire 40 is increased. Thus, in a case where the gas pressure P is decreased from the reference value PXA, the electronic controller 72 increases the assist ratio R to reduce the load on the rider. In a case where the gas pressure P further decreases and becomes less than or equal to the first pressure PX1, the electronic controller 72 sets the output TX of the motor 54 to zero or stops the driving of the motor 54. Consequently, in a state where the gas pressure P is decreased out of the appropriate range of the gas pressure P that is set for each tire 40, the motor 54 will not assist in propulsion of the bicycle 10. This avoids a situation in which a large load is applied to the tire 40. For example, in a case where the tire 40 is punctured, the electronic controller 72 sets the output TX of the motor 54 to zero or stops the driving of the motor 54.

Figure 6:
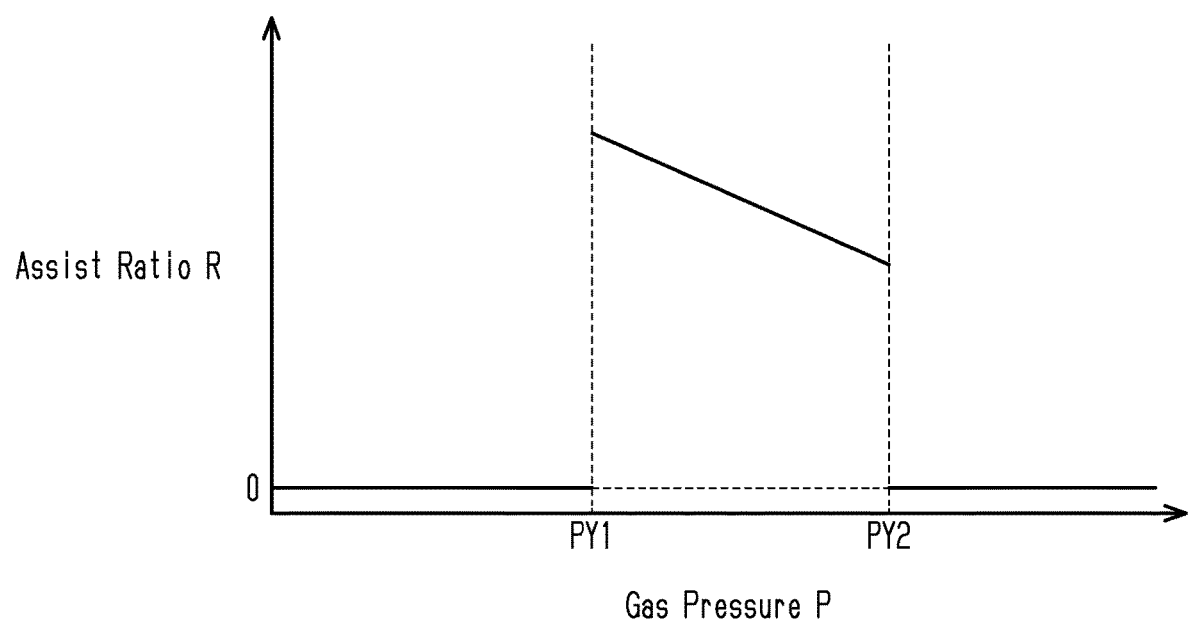
FIG. 6 is a second map specifying the relationship between gas pressure and the assist ratio stored in the memory of FIG. 2.

FIG. 6 shows a second map showing a second example of the relationship between the gas pressure P and the assist ratio R in the assist mode. In the second example, in a case where the gas pressure P is less than or equal to a first pressure PY1, the electronic controller 72 sets the output TX of the motor 54 to zero or stops the driving of the motor 54. In a case where the gas pressure P is less than or equal to the first pressure PY1, the electronic controller 72 sets the output TX of the motor 54 to zero or stops the driving of the motor 54, for example, by setting the assist ratio R to zero. In a case where the gas pressure P is greater than or equal to a second pressure PY2, which is greater than the first pressure PY1, the electronic controller 72 sets the output TX of the motor 54 to zero or stops the driving of the motor 54. In a case where the gas pressure P is greater than or equal to the second pressure PY2, the electronic controller 72 sets the output TX of the motor 54 to zero or stops the driving of the motor 54, for example, by setting the assist ratio R to zero. In a case where the gas pressure P is greater than the first pressure PY1 and less than the second pressure PY2, the electronic controller 72 decreases the assist ratio R as the gas pressure P is increased. As the gas pressure P is increased, the assist ratio R can be decreased in a linear manner, a curvilinear manner, or a stepped manner in a range from the first pressure PY1 to the second pressure PY2. The first pressure PY1 and the second pressure PY2 are set based on, for example, the kind, the thickness, and the diameter of the tire 40. The first pressure PY1 and the second pressure PY2 correspond to, for example, an upper limit value and a lower limit value of the appropriate range of the gas pressure P that is set for each tire 40. The memory 74 stores the first pressure PY1 and the second pressure PY2. The first pressure PY1 can be set to a smaller value than the lower limit value of the appropriate range of the gas pressure P that is set for each tire 40. The second pressure PY2 can be set to a larger value than the upper limit value of the appropriate range of the gas pressure P that is set for each tire 40.

The operation of the case of controlling the motor 54 using the second map, which is shown in FIG. 6, will now be described. In a case where the gas pressure P is decreased, the rolling resistance of the tire 40 is increased. Thus, in a case where the gas pressure P is decreased, the electronic controller 72 increases the assist ratio R to reduce the load on the rider. In a case where the gas pressure P is less than or equal to the first pressure PY1, the electronic controller 72 sets the output TX of the motor 54 to zero or stops the driving of the motor 54. Consequently, in a state where the gas pressure P is decreased out of the appropriate range of the gas pressure P that is set for each tire 40, the motor 54 will not assist in propulsion of the bicycle 10. This avoids a situation in which a large load is applied to the tire 40. In a case where the gas pressure P increases and becomes greater than or equal to the second pressure PY2, the electronic controller 72 sets the output TX of the motor 54 to zero or stops the driving of the motor 54. Consequently, in a state where the gas pressure P is increased out of the appropriate range of the gas pressure P that is set for each tire 40, the motor 54 will not assist in propulsion of the bicycle 10. This avoids a situation in which a large load is applied to the tire 40.

In a case where the gas pressure detection device 84 detects the gas pressure P of the gas chamber 48C of the rear tire 48, in a case where the gas pressure P is greater than the first pressure PY1 and less than the second pressure PY2, which are shown in the second map of FIG. 6, the electronic controller 72 can increase the assist ratio R as the gas pressure P is increased. The gas pressure P of the gas chamber 48C of the rear tire 48 increases on an uphill slope. Thus, the increase in the assist ratio R as the gas pressure P is increased reduces the load on the rider on an uphill slope.

Figure 7:
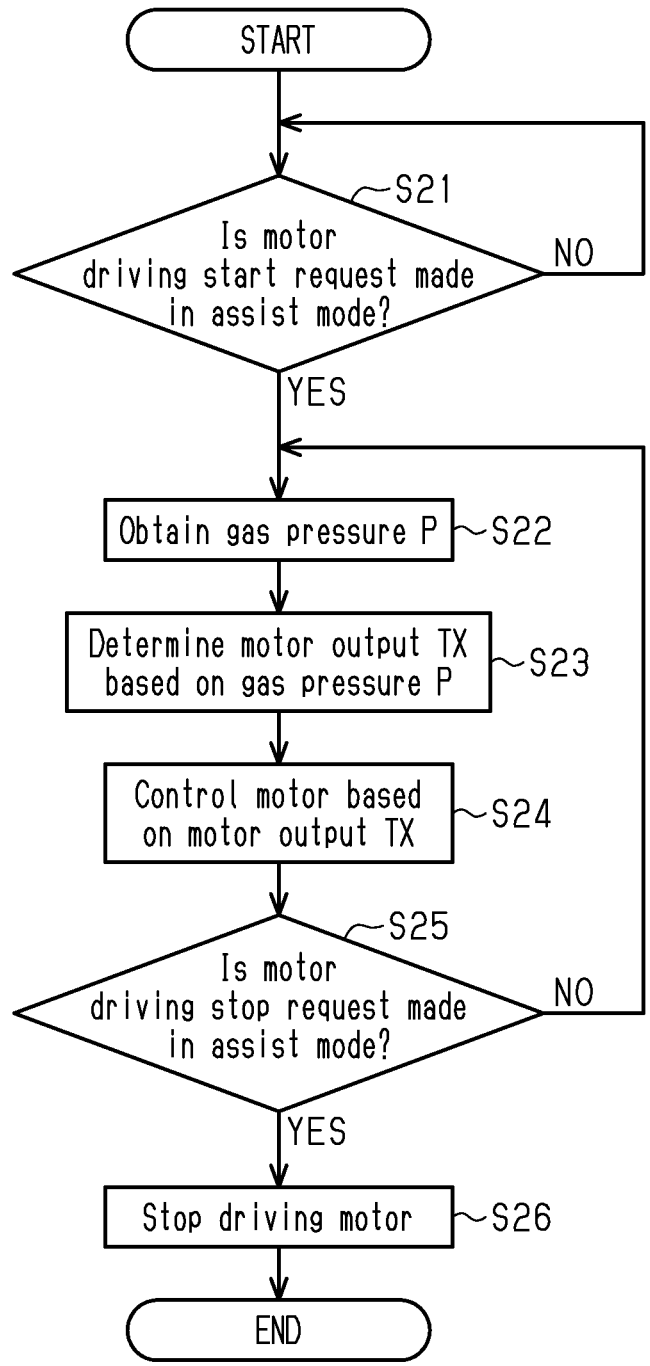
FIG. 7 is a flowchart in accordance with motor driving control executed by the electronic controller of FIG. 2 in an assist mode.

The control for driving the motor 54 in the assist mode will now be described with reference to FIG. 7. The electronic controller 72 executes the driving control during the assist mode excluding the OFF mode in predetermined cycles. The electronic controller 72 terminates the driving control in a case where at least one predetermined condition is satisfied. The predetermined condition is satisfied in at least one of a case of switching to the OFF mode from the assist mode excluding the OFF mode, a case of switching from the assist mode to the walk mode, a case where the bicycle control device 70 is deactivated, and a case where the vehicle speed V of the bicycle 10 exceeds the predetermined speed VX1. The predetermined condition can be configured to be satisfied in at least one of a case where the crank rotation sensor 78 detects that the rotation of the crank 32 is stopped and a case where the manual driving force TA becomes less than a predetermined value.

In step S21, the electronic controller 72 determines whether or not a request for starting to drive the motor 54 is made in the assist mode. For example, in a state where the mode is switched to the assist mode excluding the OFF mode in the switching control of FIG. 4, in a case where the manual driving force TA that is greater than or equal to the predetermined value is input, the electronic controller 72 determines that the request for starting to drive the motor 54 is made. The electronic controller 72 repeats step S21 in predetermined cycles until the electronic controller 72 determines that the request for starting to drive the motor 54 is made.

In a case where the electronic controller 72 determines in step S21 that the request for starting to drive the motor 54 is made in the assist mode, the electronic controller 72 proceeds to step S22 to obtain the gas pressure P and then proceeds to step S23. In step S23, the electronic controller 72 determines the output TX of the motor 54 in accordance with the gas pressure P, which is obtained in step S22. More specifically, the electronic controller 72 calculates the assist ratio R based on at least one of the map, the table, and the relational expression, which are stored in the memory 74 and specify the relationship between the gas pressure P and the assist ratio R, and determines the output TX of the motor 54 from the assist ratio R and the manual driving force TA. Alternatively, the electronic controller 72 calculates a correction coefficient based on at least one of the map, the table, and the relational expression, which are stored in the memory 74 and specify the relationship between the gas pressure P and the correction coefficient, and multiplies the correction coefficient by the output TX of the motor 54, which is calculated from the assist ratio R and the manual driving force TA. This determines the corrected output TX of the motor 54. After the output TX of the motor 54 is determined in in step S23, the electronic controller 72 proceeds to step S24.

In step S24, the electronic controller 72 controls the motor 54 to generate the output TX of the motor 54 that is determined in step S23. Then, the electronic controller 72 proceeds to step S25. More specifically, the electronic controller 72 calculates a current value corresponding to the output TX of the motor 54 and supplies the current to the motor 54.

In step S25, the electronic controller 72 determines whether or not a request for stopping the driving of the motor 54 is made in the assist mode. The electronic controller 72 determines that the request for stopping the driving of the motor 54 is made in a case where at least one stop condition is satisfied. The stop condition is satisfied in at least one of a case of changing to the OFF mode, a case of changing from the assist mode to the walk mode, and a case where the vehicle speed V of the bicycle 10 exceeds the predetermined speed VX1. Additionally, the stop condition can be configured to be satisfied in at least one of a case where the torque sensor 76 detects that the manual driving force TA is less than a predetermined value and a case where the crank rotation sensor 78 detects that the rotation of the crank 32 is stopped. In a case where the electronic controller 72 determines that the request for stopping the driving of the motor 54 is not made, the electronic controller 72 returns to step S22 and repeats steps S22 to S25. In a case where the electronic controller 72 determines in step S25 that the request for stopping the driving of the motor 54 is made, the electronic controller 72 proceeds to step S26 to stop the driving of the motor 54 and then ends the process. After a predetermined cycle, the electronic controller 72 again starts the process from step S21.

In the walk mode, the electronic controller 72 controls the motor 54 in accordance with the gas pressure P. In the walk mode, the electronic controller 72 changes the output TX of the motor 54 in accordance with the gas pressure P. The electronic controller 72 controls the motor 54 based on at least one of the map, the table, and the relational expression, which are stored in the memory 74 and specify the relationship between the gas pressure P and the output TX of the motor 54 in the walk mode. Alternatively, the electronic controller 72 can store at least one of the map, the table, and the relational expression, which specify the relationship between the gas pressure P and the correction coefficient, and correct the output TX of the motor 54, which is calculated based on the manual driving force TA, based on the correction coefficient.

Figure 8:
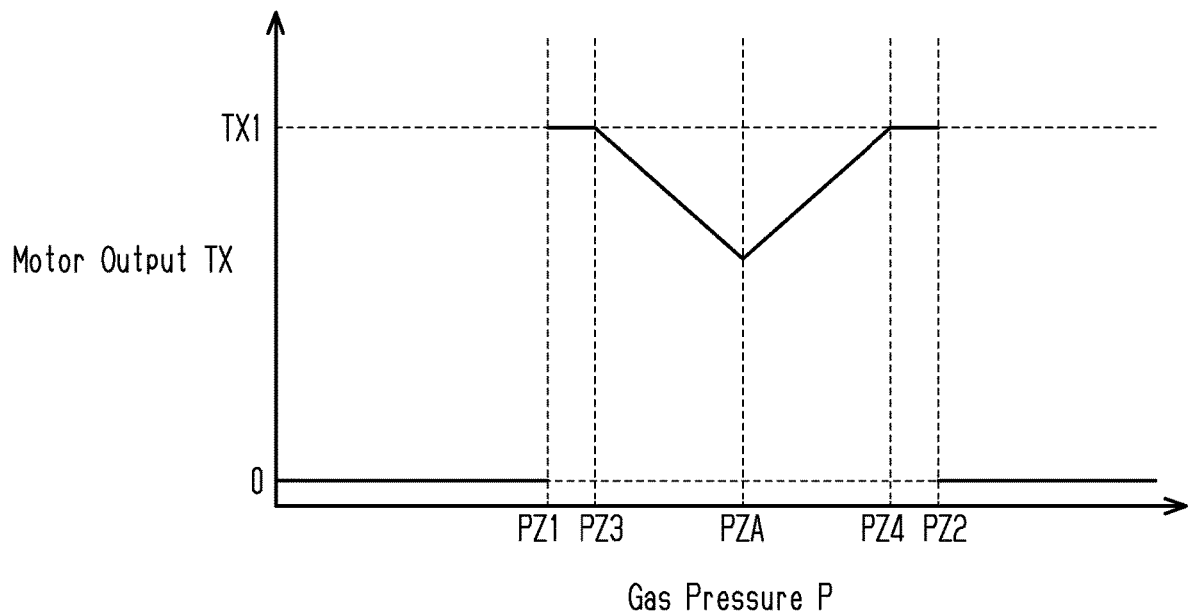
FIG. 8 is a third map specifying the relationship between gas pressure and the assist ratio stored in the memory of FIG. 2.

FIG. 8 shows a third map showing a first example of the relationship between the gas pressure P and the output TX of the motor 54 in the walk mode. In the first example, in a case where the gas pressure P is increased, the electronic controller 72 increases the output TX of the motor 54. In a case where the gas pressure P is decreased, the electronic controller 72 increases the output TX of the motor 54. The electronic controller 72 controls the motor 54 in accordance with a change amount from a reference value PZA. In a case where the gas pressure P is increased from the predetermined reference value PZA, the electronic controller 72 increases the output TX of the motor 54 compared to a case where the gas pressure P is the predetermined reference value PZA. In a case where the gas pressure P is decreased from the predetermined reference value PZA, the electronic controller 72 increases the output TX of the motor 54 compared to a case where the gas pressure P is the predetermined reference value PZA. In a case where the gas pressure P is less than or equal to a first pressure PZ1, the electronic controller 72 sets the output TX of the motor 54 to zero or stops the driving of the motor 54.

In a case where the gas pressure P is less than the reference value PZA, the electronic controller 72 increases the output TX of the motor 54 as the gas pressure P is decreased until the gas pressure P reaches a third pressure PZ3, which is less than the reference value PZA and greater than the first pressure PZ1. The output TX of the motor 54 can be increased in a linear manner, a curvilinear manner, or a stepped manner as the gas pressure P is decreased in a range from the reference value PZA to the third pressure PZ3. In a case where the gas pressure P is included in a range that is less than or equal to the third pressure PZ3 and greater than the first pressure PZ1, the electronic controller 72 sets the output TX of the motor 54 to a fixed value TX1. In a case where the gas pressure P is greater than or equal to a second pressure PZ2, which is greater than the first pressure PZ1, the electronic controller 72 sets the output TX of the motor 54 to zero or stops the driving of the motor 54.

In a case where the gas pressure P is greater than the reference value PZA, the electronic controller 72 increases the output TX of the motor 54 as the gas pressure P is increased until the gas pressure P reaches a fourth pressure PZ4, which is greater than the reference value PZA and less than the second pressure PZ2. The output TX of the motor 54 can be increased in a linear manner, a curvilinear manner, or a stepped manner as the gas pressure P is increased in a range from the reference value PZA to the fourth pressure PZ4. In a case where the gas pressure P is included in a range that is greater than or equal to the fourth pressure PZ4 and less than the second pressure PZ2, the electronic controller 72 sets the output TX of the motor 54 to the fixed value TX1.

The predetermined reference value PZA, the first pressure PZ1, the second pressure PZ2, the third pressure PZ3, and the fourth pressure PZ4 are set based on, for example, the kind, the thickness, and the diameter of the tire 40. The reference value PZA corresponds to, for example, any value of the gas pressure P that is appropriately set for each tire 40. The memory 74 stores the predetermined reference value PZA, the first pressure PZ1, the second pressure PZ2, the third pressure PZ3, and the fourth pressure PZ4. The reference value PZA can be stored in the memory 74 in a bicycle manufacturing plant or in accordance with an operation performed by the user. Each value of the first pressure PZ1, the second pressure PZ2, the third pressure PZ3, and the fourth pressure PZ4 can be automatically changed in accordance with a change in the reference value PZA. Alternatively, each value of the first pressure PZ1, the second pressure PZ2, the third pressure PZ3, and the fourth pressure PZ4 can be stored in the memory 74 together with the reference value PZA. In a case where the reference value PZA is stored in the memory 74 in accordance with an operation performed by the user, the bicycle control device 70 includes, for example, an interface used for connection with an external device through wired or wireless communication. The external device is, for example, a personal computer, a tablet computer, a smartphone, or a cycle computer. The bicycle control device 70 is operated in a setting mode. If information for changing the reference value PZA is received from the external device in the setting mode, the electronic controller 72 changes the reference value PZA, which is stored in the memory 74. The information for changing the reference value PZA is related to the gas pressure P. In a case where the reference value PZA is stored in the memory 74 in accordance with an operation performed by the user, the electronic controller 72 can store the reference value PZA in the memory 74, for example, based on a signal obtained from the sensor 84A by performing a particular operation on the user actuator 58, after the gas pressure P of the gas chamber 40C is adjusted to be in the appropriate range of the gas pressure P set for each tire 40.

The operation of the case of controlling the motor 54 using the third map, which is shown in FIG. 8, will now be described. For example, in a case where the load mounted on the bicycle 10 is increased, the gas pressure P increases. In a case where the output TX of the motor 54 is low relative to the load mounted on the bicycle 10, the bicycle 10 will not easily move forward. Thus, in a case where the gas pressure P is increased from the reference value PZA, the electronic controller 72 increases the output TX of the motor 54 to facilitate the forward movement of the bicycle 10. In a case where the gas pressure P further increases and becomes greater than or equal to the second pressure PZ2, the electronic controller 72 sets the output TX of the motor 54 to zero or stops the driving of the motor 54. Consequently, in a state where the gas pressure P is increased out of the appropriate range of the gas pressure P that is set for each tire 40, the motor 54 will not assist in propulsion of the bicycle 10. This avoids a situation in which a large load is applied to the tire 40.

In a case where the gas pressure P is decreased from the reference value PZA, the rolling resistance of the tire 40 is increased. Thus, in a case where the gas pressure P is decreased from the reference value PZA, the electronic controller 72 increases the output TX of the motor 54 to facilitate forward movement of the bicycle 10. In a case where the gas pressure P further decreases and becomes less than or equal to the first pressure PZ1, the electronic controller 72 sets the output TX of the motor 54 to zero or stops the driving of the motor 54. Consequently, in a state where the gas pressure P is decreased out of the appropriate range of the gas pressure P that is set for each tire 40, the motor 54 will not assist in propulsion of the bicycle 10. This avoids a situation in which a large load is applied to the tire 40. For example, in a case where the tire 40 is punctured, the electronic controller 72 sets the output TX of the motor 54 to zero or stops the driving of the motor 54.

Figure 9:
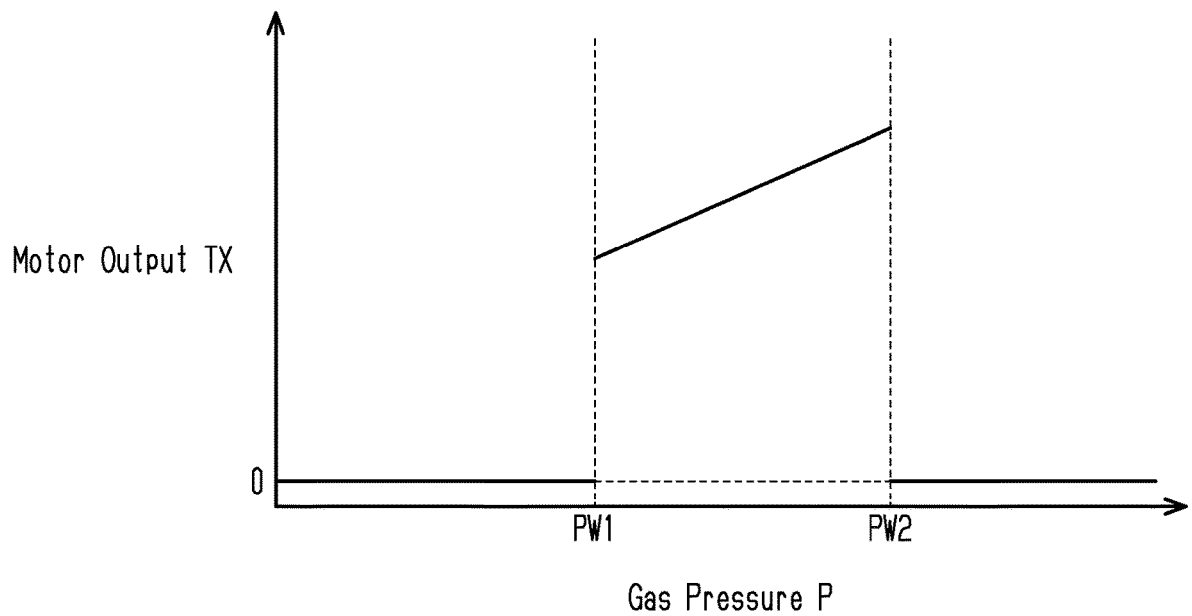
FIG. 9 is a fourth map specifying the relationship between gas pressure and the assist ratio stored in the memory of FIG. 2.

FIG. 9 shows a fourth map showing a second example of the relationship between the gas pressure P and the output TX of the motor 54 in the walk mode. In the second example, in a case where the gas pressure P is less than or equal to a first pressure PW1, the electronic controller 72 sets the output TX of the motor 54 to zero or stops the driving of the motor 54. In a case where the gas pressure P is greater than or equal to a second pressure PW2, which is greater than the first pressure PW1, the electronic controller 72 sets the output TX of the motor 54 to zero or stops the driving of the motor 54. In a case where the gas pressure P is greater than the first pressure PW1 and less than the second pressure PW2, the electronic controller 72 increases the output TX of the motor 54 as the gas pressure P is increased. The output TX of the motor 54 can be increased in a linear manner, a curvilinear manner, or a stepped manner as the gas pressure P is increased in a range from the first pressure PW1 to the second pressure PW2. The first pressure PW1 and the second pressure PW2 are set based on, for example, the kind, the thickness, and the diameter of the tire 40. The first pressure PW1 and the second pressure PW2 correspond to, for example, an upper limit value and a lower limit value of the appropriate range of the gas pressure P that is set for each tire 40. The memory 74 stores the first pressure PW1 and the second pressure PW2. The first pressure PW1 can be set to a smaller value than the lower limit value of the appropriate range of the gas pressure P that is set for each tire 40. The second pressure PW2 can be set to a larger value than the upper limit value of the appropriate range of the gas pressure P that is set for each tire 40.

The operation of the case of controlling the motor 54 using the fourth map, which is shown in FIG. 9, will now be described. For example, in a case where the load mounted on the bicycle 10 is increased, the gas pressure P increases. Thus, as the gas pressure P increases in a range from the first pressure PW1 to the second pressure PW2, the electronic controller 72 increases the output TX of the motor 54 to avoid a situation in which the assist force, which assists in propulsion of the bicycle 10, is insufficient. In a case where the gas pressure P further increases and becomes greater than or equal to the second pressure PW2, the electronic controller 72 sets the output TX of the motor 54 to zero or stops the driving of the motor 54. Consequently, in a state where the gas pressure P is increased out of the appropriate range of the gas pressure P that is set for each tire 40, the motor 54 will not assist in propulsion of the bicycle 10. This avoids a situation in which a large load is applied to the tire 40. In a case where the gas pressure P becomes less than or equal to the first pressure PW1, the electronic controller 72 sets the output TX of the motor 54 to zero or stops the driving of the motor 54. This avoids a situation in which a large load is applied to the tire 40. For example, in a case where the tire 40 is punctured, the electronic controller 72 sets the output TX of the motor 54 to zero or stops the driving of the motor 54.

In the case of starting to assist in walking the bicycle 10 in the walk mode, it is preferred that the electronic controller 72 changes an increase rate of the output TX of the motor 54 in accordance with the gas pressure P. In the case of starting to assist in walking the bicycle 10, in a case where the gas pressure P is increased, it is preferred that the electronic controller 72 decreases the increase rate of the output TX of the motor 54.

In the case of changing the vehicle speed V of the bicycle 10 in the walk mode, it is preferred that the electronic controller 72 changes a change rate of the rotational speed N of the motor 54 in accordance with the gas pressure P. In the case of changing the vehicle speed V of the bicycle 10, in a case where the gas pressure P is increased, it is preferred that the electronic controller 72 decreases the change rate of the rotational speed N of the motor 54.

Figure 10:
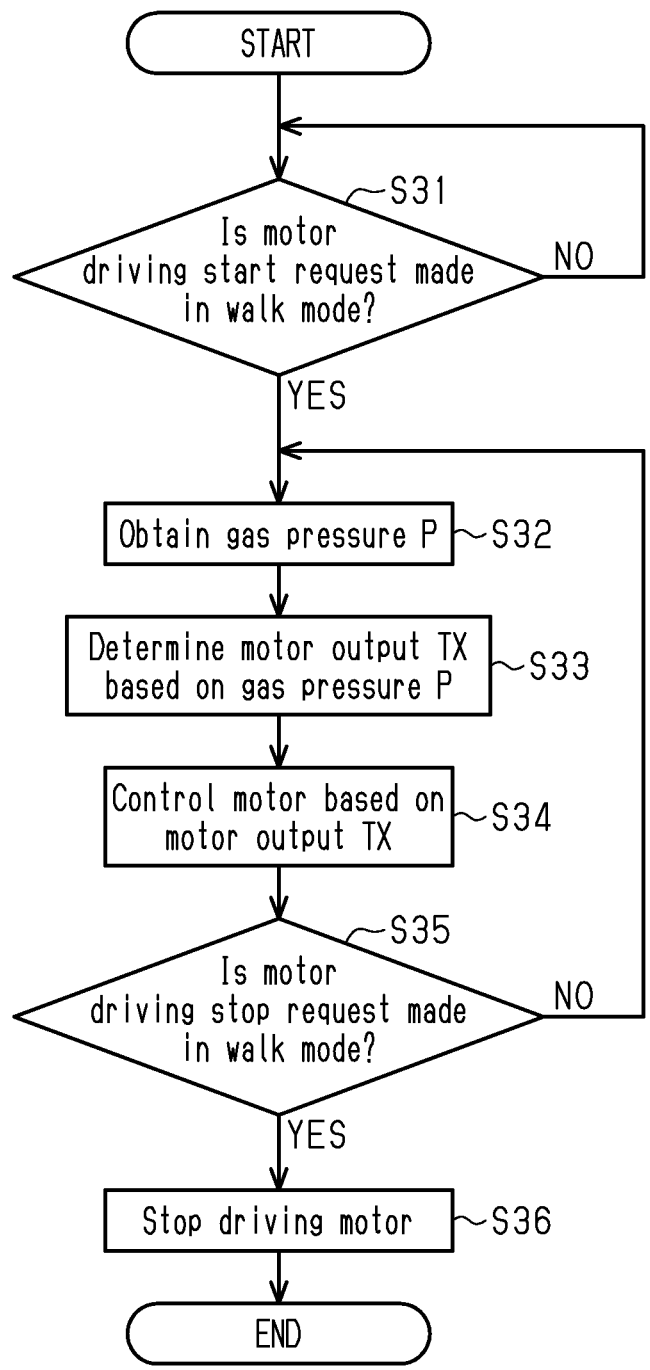
FIG. 10 is a flowchart in accordance with motor driving control executed by the electronic controller of FIG. 2 in a walk mode.

The control for driving the motor 54 in the walk mode will now be described with reference to FIG. 10. The electronic controller 72 executes the driving control during the walk mode in predetermined cycles. The electronic controller 72 terminates the driving control in a case where at least one predetermined condition is satisfied. The predetermined condition is satisfied in at least one of a case of changing to the assist mode from the walk mode, a case where the bicycle control device 70 is deactivated, and a case where the vehicle speed V of the bicycle 10 exceeds the predetermined speed VX2. The predetermined condition can be configured to be satisfied in at least one of a case where the torque sensor 76 detects that the manual driving force TA is greater than or equal to a predetermined value and a case where the crank rotation sensor 78 detects rotation of the crank 32.

In step S31, the electronic controller 72 determines whether or not a request for starting to drive the motor 54 is made in the walk mode. For example, in a state where the mode is switched to the walk mode in the switching control of FIG. 4, in a case where the second operation portion 58B of the user actuator 58 is operated and the manual driving force TA is not input, the electronic controller 72 determines that the request for starting to drive the motor 54 is made. The electronic controller 72 repeats step S31 in predetermined cycles until the electronic controller 72 determines that the request for starting to drive the motor 54 is made.

In a case where the electronic controller 72 determines in step S31 that the request for starting to drive the motor 54 is made in the walk mode, the electronic controller 72 proceeds to step S32 to obtain the gas pressure P and then proceeds to step S33. In step S33, the electronic controller 72 determines the output TX of the motor 54 in accordance with the gas pressure P, which is obtained in step S32. More specifically, the electronic controller 72 calculates the output TX of the motor 54 based on at least one of the map, the table, and the relational expression, which are stored in the memory 74 and specify the relationship between the gas pressure P and the output TX of the motor 54, to determine the output TX of the motor 54. Alternatively, the electronic controller 72 calculates a correction coefficient based on at least one of the map, the table, and the relational expression, which are stored in the memory 74 and specify the relationship between the gas pressure P and the correction coefficient, and multiplies the correction coefficient by the output TX of the motor 54, which is calculated based on the vehicle speed V. This determines the corrected output TX of the motor 54. After the output TX of the motor 54 is determined in step S33, the electronic controller 72 proceeds to step S34.

In step S34, the electronic controller 72 controls the motor 54 to generate the output TX of the motor 54 that is determined in step S33. Then, the electronic controller 72 proceeds to step S35. More specifically, the electronic controller 72 calculates a current value corresponding to the output TX of the motor 54 and supplies the current to the motor 54.

In step S35, the electronic controller 72 determines whether or not a request for stopping the driving of the motor 54 is made in the walk mode. The electronic controller 72 determines that the request for stopping the driving of the motor 54 is made in a case where at least one stop condition is satisfied. The stop condition is satisfied in at least one of a case where the operation of the second operation portion 58B is stopped in the walk mode, a case of changing from the walk mode to the assist mode, and a case where the vehicle speed V of the bicycle 10 exceeds the predetermined speed VX2. Additionally, the stop condition can be configured to be satisfied in at least one of a case where the torque sensor 76 detects that the manual driving force TA is greater than or equal to a predetermined value and a case where the crank rotation sensor 78 detects rotation of the crank 32. In a case where the electronic controller 72 determines that the request for stopping the driving of the motor 54 is not made, the electronic controller 72 returns to step S32 and repeats steps S32 to S35. In a case where the electronic controller 72 determines in step S35 that the request for stopping the driving of the motor 54 is made, the electronic controller 72 proceeds to step S36 to stop the driving of the motor 54 and then ends the process. After a predetermined cycle, the electronic controller 72 again starts the process from step S31.

Figure 11:
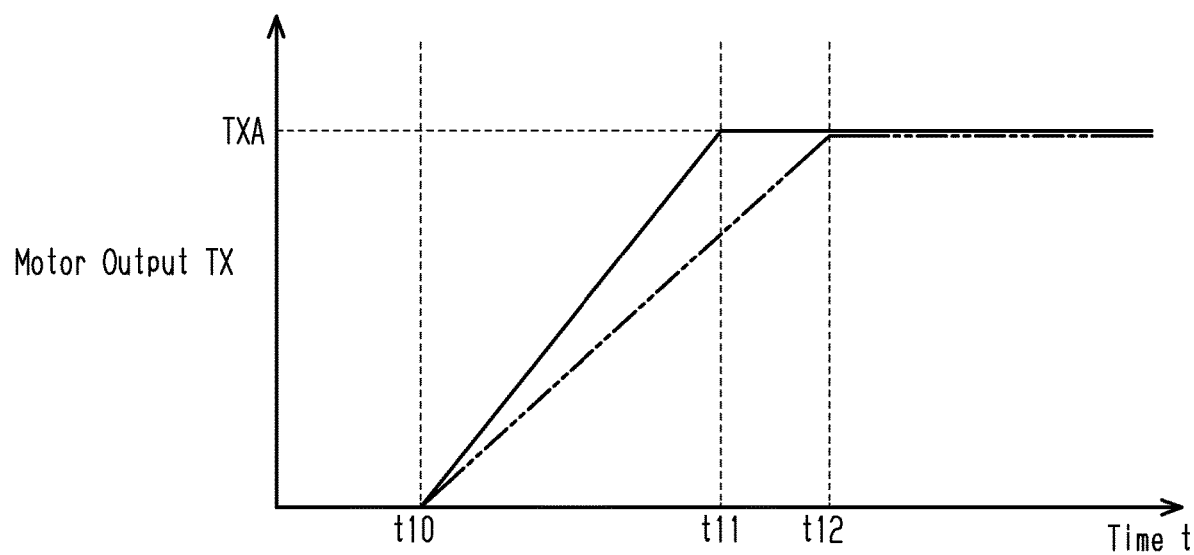
FIG. 11 is a time chart in accordance with a first example of an operation of the motor performed by the electronic controller of FIG. 2 in the walk mode.

One example of an operation of the motor 54 in the walk mode will now be described with reference to FIG. 11. The solid line of FIG. 11 indicates one example of an operation of the motor 54 in a case where the gas pressure P is a predetermined value. The double-dashed line of FIG. 11 shows one example of an operation of the motor 54 in a case where the gas pressure P is greater than that of the solid line of FIG. 11.

Time t10 indicates time at which the driving of the motor 54 is started in the walk mode.

Time t11 indicates time at which a first time has elapsed from time t10. At time t11, in a case where the gas pressure P is the predetermined value, the output TX of the motor 54 reaches a preset value TXA.

Time t12 indicates time at which a second time, which is longer than the first time, has elapsed from time t10. In a case where the gas pressure P is greater than the predetermined value, the output TX of the motor 54 reaches the preset value TXA at time t12.

For example, in a case where a large load is mounted on the bicycle 10, the gas pressure P is high. In a case where the gas pressure P is high, the increase rate of the output TX of the motor 54 can be moderated in a case of starting the walking assist in the walk mode. This stabilizes the behavior of the bicycle 10 at the time of starting to move the bicycle 10. In FIG. 11, the output TX of the motor 54 is linearly increased. Instead, the output TX of the motor 54 can be increased, for example, in a curvilinear manner so that the increase rate of the output TX is increased as the time elapses.

In the case of stopping the assist in walking the bicycle 10 in the walk mode, it is preferred that the electronic controller 72 changes a decrease rate of the output TX of the motor 54 in accordance with the gas pressure P. In the case of stopping the assist in walking the bicycle 10, in a case where the gas pressure P is increased, it is preferred that the electronic controller 72 decreases the decrease rate of the output TX of the motor 54. In this case, in a case where the gas pressure P is high, the output TX of the motor 54 is moderately decreased in the case of stopping the waking assist in the walk mode. Thus, the bicycle 10 can be slowly stopped.

Figure 12:
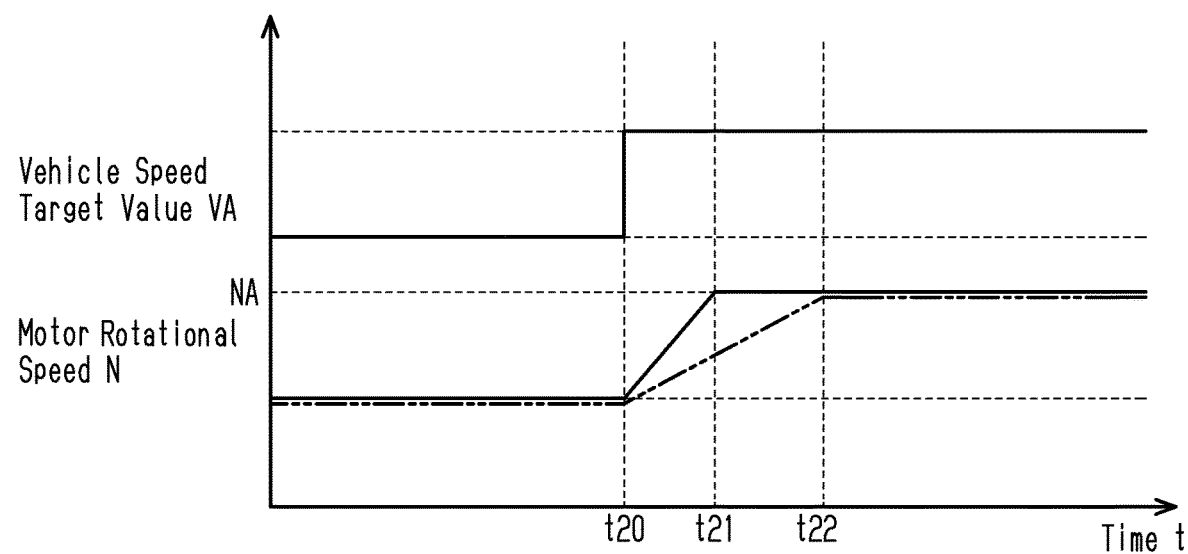
FIG. 12 is a time chart in accordance with a second example of an operation of the motor performed by the electronic controller of FIG. 2 in the walk mode.

One example of an operation of the motor 54 in the walk mode will now be described with reference to FIG. 12. The solid line of FIG. 12 shows one example of an operation of the motor 54 in a case where the gas pressure P is a predetermined value. The double-dashed line of FIG. 12 shows one example of an operation of the motor 54 in a case where the gas pressure P is greater than that of the solid line of FIG. 12.

Time t20 indicates time at which a request for changing the vehicle speed V of the bicycle 10 is set while traveling in the walk mode. The electronic controller 72 changes a target value VA of the vehicle speed V from a target value VA1 to a target value VA2.

Time t21 indicates time at which a first time elapses from time t20. At time t21, in a case where the gas pressure P is the predetermined value, the rotational speed N of the motor 54 reaches the rotational speed NA corresponding to the new target value VA2 of the vehicle speed V, which is set at time t20.

Time t22 indicates time at which a second time, which is longer than the first time, elapses from time t20. At time t22, in a case where the gas pressure P is greater than the predetermined value, the rotational speed N of the motor 54 reaches the rotational speed NA corresponding to the new target value VA2 of the vehicle speed V, which is set at time t20.

For example, in a case where a large load is mounted on the bicycle 10, the gas pressure P is high. In a case where the gas pressure P is high, the change rate of the rotational speed N of the motor 54 can be moderated in a case of changing the vehicle speed V of the bicycle 10. This stabilizes the behavior of the bicycle 10. In FIG. 12, the output TX of the motor 54 is linearly increased. Instead, the output TX of the motor 54 can be increased, for example, in a curvilinear manner so that the increase rate of the output TX is increased as the time elapses.

Second Embodiment

A second embodiment of the bicycle control device 70 will now be described with reference to FIGS. 1 and 13 to 15. The second embodiment of the bicycle control device 70 is the same as the first embodiment of the bicycle control device 70 except that the gas pressure detection device 84 includes a first gas pressure detection device 86 and a second gas pressure detection device 88. Thus, the same reference characters are given to those elements that are the same as the corresponding elements of the first embodiment. Such elements will not be described in detail.

Figure 13:
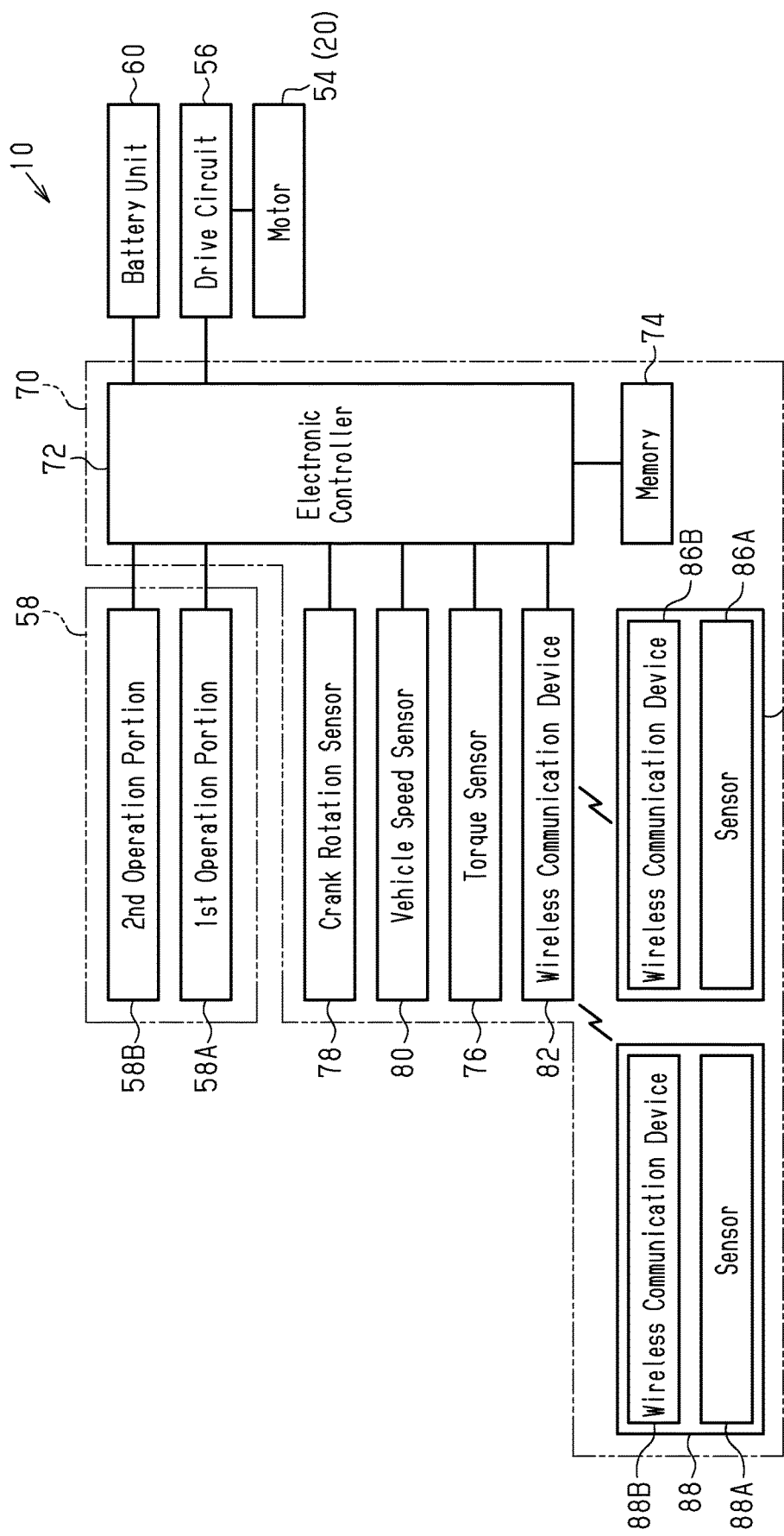
FIG. 13 is a block diagram in accordance with the electric configuration of a bicycle control device in accordance with a second embodiment.

As shown in FIG. 13, the gas pressure detection device 84 includes the first gas pressure detection device 86 and the second gas pressure detection device 88. The gas pressure P detected by the gas pressure detection device 84 includes a first gas pressure P1 of the front tire 46 and a second gas pressure P2 of the rear tire 48.

The first gas pressure detection device 86 is attached to the valve 46B of the front tire 46, which is shown in FIG. 1, to detect the first gas pressure P1 of the gas chamber 46C of the front tire 46. As shown in FIG. 13, the first gas pressure detection device 86 is configured to perform wireless communication with the electronic controller 72. The first gas pressure detection device 86 includes a sensor 86A, which outputs a signal corresponding to the gas pressure P, and a wireless communication device 86B, which outputs a signal corresponding to the output of the sensor 86A through wireless communication. The sensor 86A includes, for example, a pressure sensor. The sensor 86A can include a different sensor as long as the gas pressure P is detectable. The first gas pressure detection device 86 further includes a battery that supplies electric power to the sensor 86A and the wireless communication device 86B. The wireless communication device 86B is a one-way transmitter in the second embodiment.

The second gas pressure detection device 88 is attached to the valve 48B of the rear tire 48, which is shown in FIG. 1, to detect the second gas pressure P2 of the gas chamber 48C of the rear tire 48. As shown in FIG. 13, the second gas pressure detection device 88 is configured to perform wireless communication with the electronic controller 72. The second gas pressure detection device 88 includes a sensor 88A, which outputs a signal corresponding to the gas pressure P, and a wireless communication device 88B, which outputs a signal corresponding to the output of the sensor 88A through wireless communication. The sensor 88A includes, for example, a pressure sensor. The sensor 88A can include a different sensor as long as the gas pressure P is detectable. The second gas pressure detection device 88 further includes a battery that supplies electric power to the sensor 88A and the wireless communication device 88B. The wireless communication device 88B is a one-way transmitter in the second embodiment.

The wireless communication device 82 performs wireless communications with the wireless communication device 86B of the first gas pressure detection device 86 and the wireless communication device 88B of the second gas pressure detection device 88. The wireless communication device 82 processes signals received from the first gas pressure detection device 86 and the second gas pressure detection device 88 and transmits the signals to the electronic controller 72.

In the assist mode, the electronic controller 72 controls the motor 54 in accordance with the gas pressure P. In the assist mode, the electronic controller 72 changes at least one of the assist ratio R and the output TX of the motor 54 in accordance with the gas pressure P. The assist mode includes a first mode A1 and a second mode A2, which differs from the first mode A1 in the control state of the motor 54. The electronic controller 72 is configured to switch the assist mode between the first mode A1 and the second mode A2. The assist ratio R1 of the first mode A1 is less than the assist ratio R2 of the second mode A2. In a case where a plurality of assist modes is provided, it is preferred that the first mode A1 and the second mode A2 are provided for each mode of the assist modes having different assist ratios R.

In the walk mode, the electronic controller 72 controls the motor 54 in accordance with the gas pressure P. In the walk mode, the electronic controller 72 changes the output TX of the motor 54 in accordance with the gas pressure P. The walk mode includes a first mode B1 and a second mode B2, which differs from the first mode B1 in the control state of the motor 54. The electronic controller 72 is configured to switch the walk mode between the first mode B1 and the second mode B2. The electronic controller 72 increases the output TX of the motor 54 in the case of assisting in walking the bicycle 10 in the second mode B2 from the output TX of the motor 54 in the case of assisting in walking the bicycle 10 in the first mode B1.

The electronic controller 72 controls the motor 54 in accordance with the first gas pressure P1 and the second gas pressure P2. In a case where an increase amount of the first gas pressure P1 is less than or equal to a first threshold value D1, the electronic controller 72 controls the motor 54 in the first modes A1, B1. In a case where the increase amount of the first gas pressure P1 is greater than the first threshold value D1, the electronic controller 72 controls the motor 54 in the second modes A2, B2. In a case where an increase amount of the second gas pressure P2 is less than or equal to a second threshold value D2, the electronic controller 72 controls the motor 54 in the first modes A1, B1. In a case where the increase amount of the second gas pressure P2 is greater than the second threshold value D2, the electronic controller 72 controls the motor 54 in the second modes A2, B2. In a case where the increase amount of the first gas pressure P1 is less than or equal to the first threshold value D1 and the increase amount of the second gas pressure P2 is less than or equal to the second threshold value D2, the electronic controller 72 controls the motor 54 in the first modes A1, B1. In a case where the increase amount of the first gas pressure P1 is greater than the first threshold value D1 and in a case where the increase amount of the second gas pressure P2 is greater than the second threshold value D2, the electronic controller 72 controls the motor 54 in the second modes A2, B2. The first threshold value D1 of the assist mode can conform to or differ from the first threshold value D1 of the walk mode. The second threshold value D2 of the assist mode can conform to or differ from the second threshold value D2 of the walk mode.

Preferably, the electronic controller 72 changes the first threshold value D1 in accordance with at least one of the ambient temperature and the altitude. Preferably, the electronic controller 72 changes the second threshold value D2 in accordance with at least one of the ambient temperature and the altitude. In one example, the ambient temperature is detected by a temperature sensor provided on the bicycle 10. The bicycle control device 70 can include a temperature sensor. In another example, the ambient temperature is detected by an external device and transmitted to the electronic controller 72 via, for example, wireless communication. The external device is, for example, a smartphone or a cycle computer. In one example, the altitude is detected by an altitude sensor provided on the bicycle 10. Alternatively, the bicycle control device 70 can include an altitude sensor. In another example, the altitude is detected by an external device and transmitted to the electronic controller 72 via, for example, wireless communication. The external device is, for example, a smartphone or a cycle computer. In one example, the electronic controller 72 increases the first threshold value D1 and the second threshold value D2 as the ambient temperature increases. For example, in a case where the ambient temperature is increased by one degree, the threshold values D1, D2 are increased by 1000 pascals. In one example, the electronic controller 72 increases the first threshold value D1 and the second threshold value D2 as the altitude increases.

Preferably, the electronic controller 72 decreases the increase rate of the output TX of the motor 54 in the case of starting to assist in walking the bicycle 10 in the second mode from the increase rate of the output TX of the motor 54 in the case of starting to assist in walking the bicycle 10 in the first mode.

Preferably, the electronic controller 72 decreases the change rate of the rotational speed N of the motor 54 in the case of changing the vehicle speed V of the bicycle 10 in the second mode from the change rate of the rotational speed N of the motor 54 in the case of changing the vehicle speed V of the bicycle 10 in the first mode.

The mode switching control in the assist mode will now be described with reference to FIG. 14. The electronic controller 72 executes the switching control during the assist mode excluding the OFF mode in predetermined cycles. The electronic controller 72 terminates the switching control in a case where at least one predetermined condition is satisfied. The predetermined condition is satisfied in at least one of a case of changing to the OFF mode from the assist mode excluding the OFF mode, a case of changing from the assist mode to the walk mode, a case where the bicycle control device 70 is deactivated, and a case where the vehicle speed V of the bicycle 10 exceeds the predetermined speed VX1. The predetermined condition can be configured to be satisfied in at least one of a case where the crank rotation sensor 78 detects that the rotation of the crank 32 is stopped and a case where the manual driving force TA becomes less than a predetermined value.

In a case where the mode is changed to the assist mode excluding the OFF mode, the electronic controller 72 proceeds to step S41 to start the process. The electronic controller 72 obtains the first gas pressure P1 and the second gas pressure P2 in step S41 and then proceeds to step S42.

In step S42, the electronic controller 72 determines whether or not the increase amount of the first gas pressure P1 is less than or equal to the first threshold value D1. The electronic controller 72 calculates the increase amount of the first gas pressure P1, for example, by storing the first gas pressure P1 in the memory 74 at a time of activating the bicycle control device 70 and obtaining the difference between the first gas pressure P1 that is stored in the memory 74 and the first gas pressure P1 that is obtained in step S41. In a case where the electronic controller 72 determines in step S42 that the increase amount of the first gas pressure P1 is less than or equal to the first threshold value D1, the electronic controller 72 proceeds to step S43.

In step S43, the electronic controller 72 determines whether or not the increase amount of the second gas pressure P2 is less than or equal to the second threshold value D2. The electronic controller 72 calculates the increase amount of the second gas pressure P2, for example, by storing the second gas pressure P2 in the memory 74 at the time of activating the bicycle control device 70 and obtaining the difference between the second gas pressure P2 that is stored in the memory 74 and the second gas pressure P2 that is obtained in step S41. In a case where the electronic controller 72 determines in step S43 that the increase amount of the second gas pressure P2 is less than or equal to the second threshold value D2, the electronic controller 72 proceeds to step S44.

In step S44, the electronic controller 72 selects the first mode A1 and ends the process. After a predetermined cycle, the electronic controller 72 again starts the process from step S41. In a case where the second mode A2 is selected in step S44, the electronic controller 72 switches to the first mode A1. In a case where the first mode A1 is selected, the electronic controller 72 maintains the first mode A1.

In a case where the electronic controller 72 determines in step S42 that the increase amount of the first gas pressure P1 is greater than the first threshold value D1 and in a case where the electronic controller 72 determines in step S43 that the increase amount of the second gas pressure P2 is greater than the second threshold value D2, the electronic controller 72 proceeds to step S45. In step S45, the electronic controller 72 selects the second mode A2 and ends the process. After a predetermined cycle, the electronic controller 72 again starts the process from step S41. In a case where the first mode A1 is selected in step S45, the electronic controller 72 switches to the second mode A2. In a case where the second mode A2 is selected, the electronic controller 72 maintains the second mode A2.

The electronic controller 72 can calculate the increase amount of the first gas pressure P1, for example, by storing the first gas pressure P1 in the memory 74 at a time of performing a particular operation on the user actuator 58 and, in step S42, obtaining the difference between the first gas pressure P1 that is stored in the memory 74 and the first gas pressure P1 that is obtained in step S41. The electronic controller 72 can calculate the increase amount of the second gas pressure P2, for example, by storing the second gas pressure P2 in the memory 74 at a time of performing a particular operation on the user actuator 58 and, in step S43, obtaining the difference between the second gas pressure P2 that is stored in the memory 74 and the second gas pressure P2 that is obtained in step S41.

The mode switching control in the walk mode will now be described with reference to FIG. 15. The electronic controller 72 executes the switching control during the walk mode in predetermined cycles. The electronic controller 72 terminates the mode switching control in a case where at least one predetermined condition is satisfied. The predetermined condition is satisfied in at least one of a case of changing from the walk mode to the assist mode and a case where the bicycle control device 70 is deactivated. The predetermined condition can be configured to be satisfied in at least one of a case where the torque sensor 76 detects that the manual driving force TA is greater than or equal to the predetermined value and a case where the crank rotation sensor 78 detects rotation of the crank 32.

In a case where the walk mode is set, the electronic controller 72 proceeds to step S51 to start the process. The electronic controller 72 obtains the first gas pressure P1 and the second gas pressure P2 in step S51 and then proceeds to step S52.

In step S52, the electronic controller 72 determines whether or not the increase amount of the first gas pressure P1 is less than or equal to the first threshold value D1. The electronic controller 72 calculates the increase amount of the first gas pressure P1, for example, by storing the first gas pressure P1 in the memory 74 at a time of activating the bicycle control device 70 and obtaining the difference between the first gas pressure P1 that is stored in the memory 74 and the first gas pressure P1 that is obtained in step S51. In a case where the electronic controller 72 determines in step S52 that the increase amount of the first gas pressure P1 is less than or equal to the first threshold value D1, the electronic controller 72 proceeds to step S53.

In step S53, the electronic controller 72 determines whether or not the increase amount of the second gas pressure P2 is less than or equal to the second threshold value D2. The electronic controller 72 calculates the increase amount of the second gas pressure P2, for example, by storing the second gas pressure P2 in the memory 74 at a time of activating the bicycle control device 70 and obtaining the difference between the second gas pressure P2 that is stored in the memory 74 and the second gas pressure P2 that is obtained in step S51. In a case where the electronic controller 72 determines in step S53 that the increase amount of the second gas pressure P2 is less than or equal to the second threshold value D2, the electronic controller 72 proceeds to step S54.

In step S54, the electronic controller 72 selects the first mode B1 and ends the process. After a predetermined cycle, the electronic controller 72 again starts the process from step S51. In a case where the second mode B2 is selected in step S54, the electronic controller 72 switches to the first mode B1. In a case where the first mode B1 is selected, the electronic controller 72 maintains the first mode B1.

In a case where the electronic controller 72 determines in step S52 that the increase amount of the first gas pressure P1 is greater than the first threshold value D1 and a case where the electronic controller 72 determines in step S53 that the increase amount of the second gas pressure P2 is greater than the second threshold value D2, the electronic controller 72 proceeds to step S55. In step S55, the electronic controller 72 selects the second mode B2 and ends the process. After a predetermined cycle, the electronic controller 72 again starts the process form step S51. In a case where the first mode B1 is selected in step S55, the electronic controller 72 switches to the second mode B2. In a case where the second mode B2 is selected, the electronic controller 72 maintains the second mode B2.

The electronic controller 72 can calculates the increase amount of the first gas pressure P1, for example, by storing the first gas pressure P1 in the memory 74 at a time of performing a particular operation on the user actuator 58 and, in step S52, obtaining the difference between the first gas pressure P1 that is stored in the memory 74 and the first gas pressure P1 that is obtained in step S51. The electronic controller 72 can calculate the increase amount of the second gas pressure P2, for example, by storing the second gas pressure P2 in the memory 74 at a time of performing a particular operation on the user actuator 58 and, in step S53, obtaining the difference between the second gas pressure P2 that is stored in the memory 74 and the second gas pressure P2 that is obtained in step S51.

Third Embodiment

Figure 16:
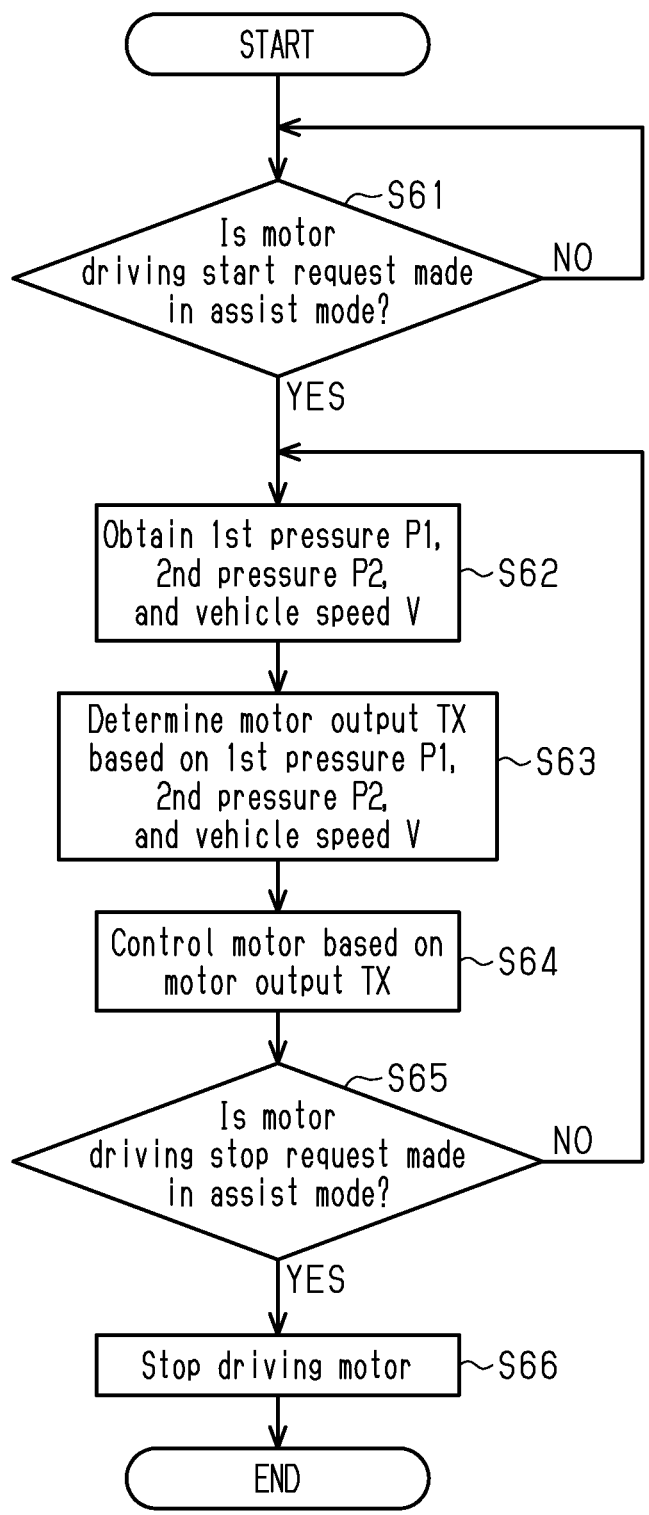
FIG. 16 is a flowchart in accordance with motor driving control executed by an electronic controller in accordance with a third embodiment in the assist mode.
Figure 17:
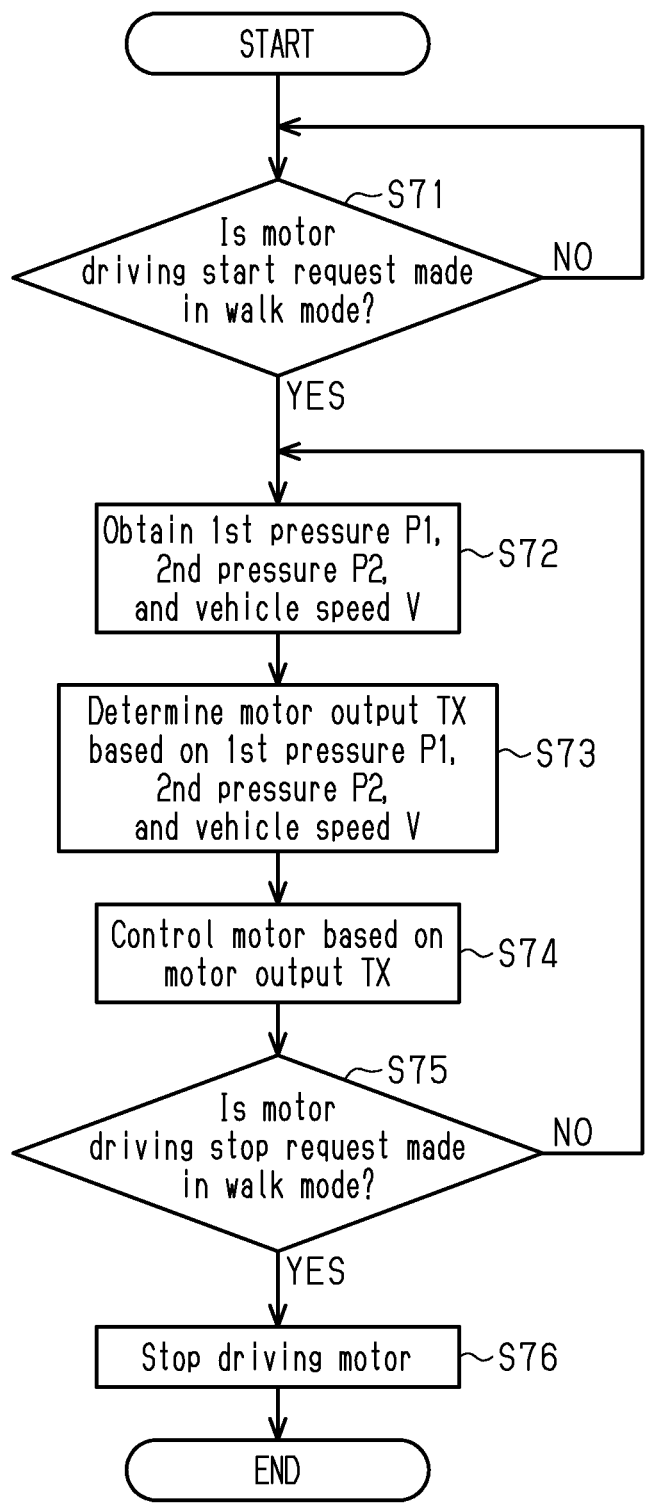
FIG. 17 is a flowchart in accordance with motor driving control executed by the electronic controller in accordance with the third embodiment in the walk mode.

A third embodiment of the bicycle control device 70 will now be described with reference to FIGS. 13, 16, and 17. The third embodiment of the bicycle control device 70 is the same as the first embodiment of the bicycle control device 70 except that the output TX of the motor 54 is changed by a comparison between the first gas pressure P1 and the second gas pressure P2 and the gas pressure detection device 84 includes the first gas pressure detection device 86 and the second gas pressure detection device 88 in the same manner as the second embodiment. Thus, the same reference characters are given to those elements that are the same as the corresponding elements of the first embodiment. Such elements will not be described in detail.

As shown in FIG. 13, the gas pressure detection device 84 includes the first gas pressure detection device 86 and the second gas pressure detection device 88. The gas pressure P detected by the gas pressure detection device 84 includes the first gas pressure P1 of the front tire 46 and the second gas pressure P2 of the rear tire 48.

In the assist mode, the electronic controller 72 controls the motor 54 in accordance with the gas pressure P. In the assist mode, the electronic controller 72 changes at least one of the assist ratio R and the output TX of the motor 54 in accordance with the gas pressure P. In the assist mode, in a case where the increase amount of the first gas pressure P1 is greater than the increase amount of the second gas pressure P2 and the vehicle speed V of the bicycle 10 is decreased, the electronic controller 72 reduces the output TX of the motor 54.

The control for driving the motor 54 in the assist mode will now be described with reference to FIG. 16. The electronic controller 72 executes the driving control during the assist mode excluding the OFF mode in predetermined cycles. The electronic controller 72 terminates the driving control in a case where at least one predetermined condition is satisfied. The predetermined condition is satisfied in at least one of a case of changing to the OFF mode from the assist mode excluding the OFF mode, a case of changing from the assist mode to the walk mode, a case where the bicycle control device 70 is deactivated, and a case where the vehicle speed V of the bicycle 10 exceeds the predetermined speed VX1. The predetermined condition can be configured to be satisfied in at least one of a case where the crank rotation sensor 78 detects that the rotation of the crank 32 is stopped and a case where the manual driving force TA becomes less than a predetermined value.

In step S61, the electronic controller 72 determines whether or not a request for starting to drive the motor 54 is made in the assist mode. For example, in a state where the mode is switched to the assist mode excluding the OFF mode in the switching control of FIG. 4, in a case where the manual driving force TA that is greater than or equal to the predetermined value is input, the electronic controller 72 determines that the request for starting to drive the motor 54 is made. The electronic controller 72 repeats step S61 in predetermined cycles until the electronic controller 72 determines that the request for starting to drive the motor 54 is made.

In a case where the electronic controller 72 determines in step S61 that the request for starting to drive the motor 54 is made in the assist mode, the electronic controller 72 proceeds to step S62 to obtain the first gas pressure P1, the second gas pressure P2, and the vehicle speed V and then proceeds to step S63.

In step S63, the electronic controller 72 determines the output TX of the motor 54 in accordance with the first gas pressure P1, the second gas pressure P2, and the vehicle speed V, which are obtained in step S62. More specifically, in a case where the increase amount of the first gas pressure P1 is greater than the increase amount of the second gas pressure P2 and the vehicle speed V of the bicycle 10 is decreased, the electronic controller 72 reduces the output TX of the motor 54. The electronic controller 72 decreases the assist ratio R, for example, compared to a case where the increase amount of the first gas pressure P1 is less than or equal to the increase amount of the second gas pressure P2. The electronic controller 72 calculates the increase amount of the first gas pressure P1, for example, by storing the first gas pressure P1 in the memory 74 at a time of activating the bicycle control device 70 and obtaining the difference between the first gas pressure P1 that is stored in the memory 74 and the first gas pressure P1 that is obtained in step S62. The electronic controller 72 calculates the increase amount of the second gas pressure P2, for example, by storing the second gas pressure P2 in the memory 74 at a time of activating the bicycle control device 70 and obtaining the difference between the second gas pressure P2 that is stored in the memory 74 and the second gas pressure P2 that is obtained in step S62. The electronic controller 72 determines whether or not the vehicle speed V is decreased, for example, by comparing the vehicle speed V that is obtained in step S62 with the vehicle speed V that is obtained at a predetermined time earlier. The electronic controller 72 calculates the assist ratio R based on at least one of the map, the table, and the relational expression, which are stored in the memory 74 in advance and specify the relationship among the difference between the increase amount of the first gas pressure P1 and the increase amount of the second gas pressure P2, the decrease amount of the vehicle speed V, and the assist ratio R, and determines the output TX of the motor 54 from the assist ratio R and the manual driving force TA. Alternatively, the electronic controller 72 calculates the assist ratio R by calculating a correction coefficient based on at least one of the map, the table, and the relational expression, which are stored in the memory 74 in advance and specify the relationship among the difference between the increase amount of the first gas pressure P1 and the increase amount of the second gas pressure P2, the decrease amount of the vehicle speed V, and the correction coefficient, and multiplying the correction coefficient by the assist ratio R, which is set in the assist mode. The electronic controller 72 determines the output TX of the motor 54 from the calculated assist ratio R and the manual driving force TA.

In step S64, the electronic controller 72 controls the motor 54 to generate the output TX of the motor 54 that is determined in step S63 and then proceeds to step S65. More specifically, the electronic controller 72 calculates a current value corresponding to the output TX of the motor 54 and supplies the current to the motor 54.

In step S65, the electronic controller 72 determines whether or not a request for stopping the driving of the motor 54 is made in the assist mode. The electronic controller 72 determines that the request for stopping the driving of the motor 54 is made in a case where at least one stop condition is satisfied. The stop condition is satisfied in at least one of a case of changing to the OFF mode, a case of changing from the assist mode to the walk mode, and a case where the vehicle speed V of the bicycle 10 exceeds the predetermined speed VX1. Additionally, the stop condition can be configured to be satisfied in at least one of a case where the torque sensor 76 detects that the manual driving force TA is less than a predetermined value and a case where the crank rotation sensor 78 detects that the rotation of the crank 32 is stopped. In a case where the electronic controller 72 determines that the request for stopping the driving of the motor 54 is not made, the electronic controller 72 returns to step S62 and repeats steps S62 to S65. In a case where the electronic controller 72 determines in step S65 that the request for stopping the driving of the motor 54 is made, the electronic controller 72 stops the driving of the motor 54 in step S66 and ends the process. After a predetermined cycle, the electronic controller 72 again starts the process from step S61.

The electronic controller 72 can calculate the increase amounts of the first gas pressure P1 and the second gas pressure P2, for example, by storing the first gas pressure P1 and the second gas pressure P2 in the memory 74 at a time of performing a particular operation on the user actuator 58 and, in step S63, obtaining the difference between the first gas pressure P1 that is stored in the memory 74 and the first gas pressure P1 that is obtained in step S62 and the difference between the second gas pressure P2 that is stored in the memory 74 and the second gas pressure P2 that is obtained in step S62.

In the walk mode, the electronic controller 72 controls the motor 54 in accordance with the gas pressure P. In the walk mode, the electronic controller 72 changes the output TX of the motor 54 in accordance with the gas pressure P. In the walk mode, in a case where the increase amount of the first gas pressure P1 is greater than the increase amount of the second gas pressure P2 and the vehicle speed V of the bicycle 10 is decreased, the electronic controller 72 reduces the output TX of the motor 54.

The control for driving the motor 54 in the walk mode will now be described with reference to FIG. 17. The electronic controller 72 executes the driving control during the walk mode in predetermined cycles. The electronic controller 72 terminates the driving control in a case where at least one predetermined condition is satisfied. The predetermined condition is satisfied in at least one of a case of changing from the walk mode to the assist mode, a case where the bicycle control device 70 is deactivated, and a case where the vehicle speed V of the bicycle 10 exceeds the predetermined speed VX2. The predetermined condition can be configured to be satisfied in at least one of a case where the torque sensor 76 detects that the manual driving force TA is greater than or equal to a predetermined value and a case where the crank rotation sensor 78 detects rotation of the crank 32.

In step S71, the electronic controller 72 determines whether or not a request for starting to drive the motor 54 is made in the walk mode. For example, in a state where the mode is switched to the walk mode in the switching control of FIG. 4, in a case where the second operation portion 58B of the user actuator 58 is operated and the manual driving force TA is not input, the electronic controller 72 determines that the request for starting to drive the motor 54 is made. The electronic controller 72 repeats step S71 in predetermined cycles until the electronic controller 72 determines that the request for starting to drive the motor 54 is made.

In a case where the electronic controller 72 determines in step S71 that the request for starting to drive the motor 54 is made in the walk mode, the electronic controller 72 proceeds to step S72 to obtain the first gas pressure P1, the second gas pressure P2, and the vehicle speed V and then proceeds to step S73.

In step S73, the electronic controller 72 determines the output TX of the motor 54 in accordance with the first gas pressure P1, the second gas pressure P2, and the vehicle speed V, which are obtained in step S72. More specifically, in a case where the increase amount of the first gas pressure P1 is greater than the increase amount of the second gas pressure P2 and the vehicle speed V of the bicycle 10 is decreased, the electronic controller 72 reduces the output TX of the motor 54. The electronic controller 72 calculates the increase amount of the first gas pressure P1, for example, by storing the first gas pressure P1 in the memory 74 at a time of activating the bicycle control device 70 and obtaining the difference between the first gas pressure P1 that is stored in the memory 74 and the first gas pressure P1 that is obtained in step S72. The electronic controller 72 calculates the increase amount of the second gas pressure P2, for example, by storing the second gas pressure P2 in the memory 74 at a time of activating the bicycle control device 70 and obtaining the difference between the second gas pressure P2 that is stored in the memory 74 and the second gas pressure P2 that is obtained in step S72. The electronic controller 72 determines whether or not the vehicle speed V is decreased, for example, by comparing the vehicle speed V that is obtained in step S72 with the vehicle speed V that is obtained a predetermined time earlier. In a case where the increase amount of the first gas pressure P1 is greater than the increase amount of the second gas pressure P2 and the vehicle speed V of the bicycle 10 is decreased, the electronic controller 72 determines that the output TX of the motor 54 is a value that is lower than the output TX of the motor 54 that is set in accordance with, for example, the vehicle speed V. After the output TX of the motor 54 is determined in step S73, the electronic controller 72 proceeds to step S74.

In step S74, the electronic controller 72 controls the motor 54 to generate the output TX of the motor 54 that is determined in step S73 and then proceeds to step S75. More specifically, the electronic controller 72 calculates a current value corresponding to the output TX of the motor 54 and supplies the current to the motor 54.

In step S75, the electronic controller 72 determines whether or not a request for stopping the driving of the motor 54 is made in the walk mode. The electronic controller 72 determines that the request for stopping the driving of the motor 54 is made in a case where at least one stop condition is satisfied. The stop condition is satisfied in at least one of a case of changing from the walk mode to the assist mode and a case where the vehicle speed V of the bicycle 10 exceeds the predetermined speed VX2. Additionally, the stop condition can be configured to be satisfied in at least one of a case where the torque sensor 76 detects that the manual driving force TA is greater than or equal to a predetermined value and a case where the crank rotation sensor 78 detects rotation of the crank 32. In a case where the electronic controller 72 determines that the request for stopping the driving of the motor 54 is not made, the electronic controller 72 returns to step S72 and repeats steps S72 to S75. In a case where the electronic controller 72 determines in step S75 that the request for stopping the driving of the motor 54 is made, the electronic controller 72 proceeds to step S76 to stop the driving of the motor 54 and ends the process. After a predetermined cycle, the electronic controller 72 again starts the process from step S71.

The electronic controller 72 can calculate the increase amounts of the first gas pressure P1 and the second gas pressure P2, for example, by storing the first gas pressure P1 and the second gas pressure P2 in the memory 74 at a time of performing a particular operation on the user actuator 58 and, in step S73, obtaining the difference between the first gas pressure P1 that is stored in the memory 74 and the first gas pressure P1 that is obtained in step S72 and the difference between the second gas pressure P2 that is stored in the memory 74 and the second gas pressure P2 that is obtained in step S72.

Fourth Embodiment

A fourth embodiment of the bicycle control device 70 will now be described with reference to FIGS. 18 and 19. The fourth embodiment of the bicycle control device 70 is the same as the first embodiment of the bicycle control device 70 except that the electric component 20 includes a suspension 90. The same reference characters are given to those elements that are the same as the corresponding elements of the first embodiment. Such elements will not be described in detail.

Figure 18:
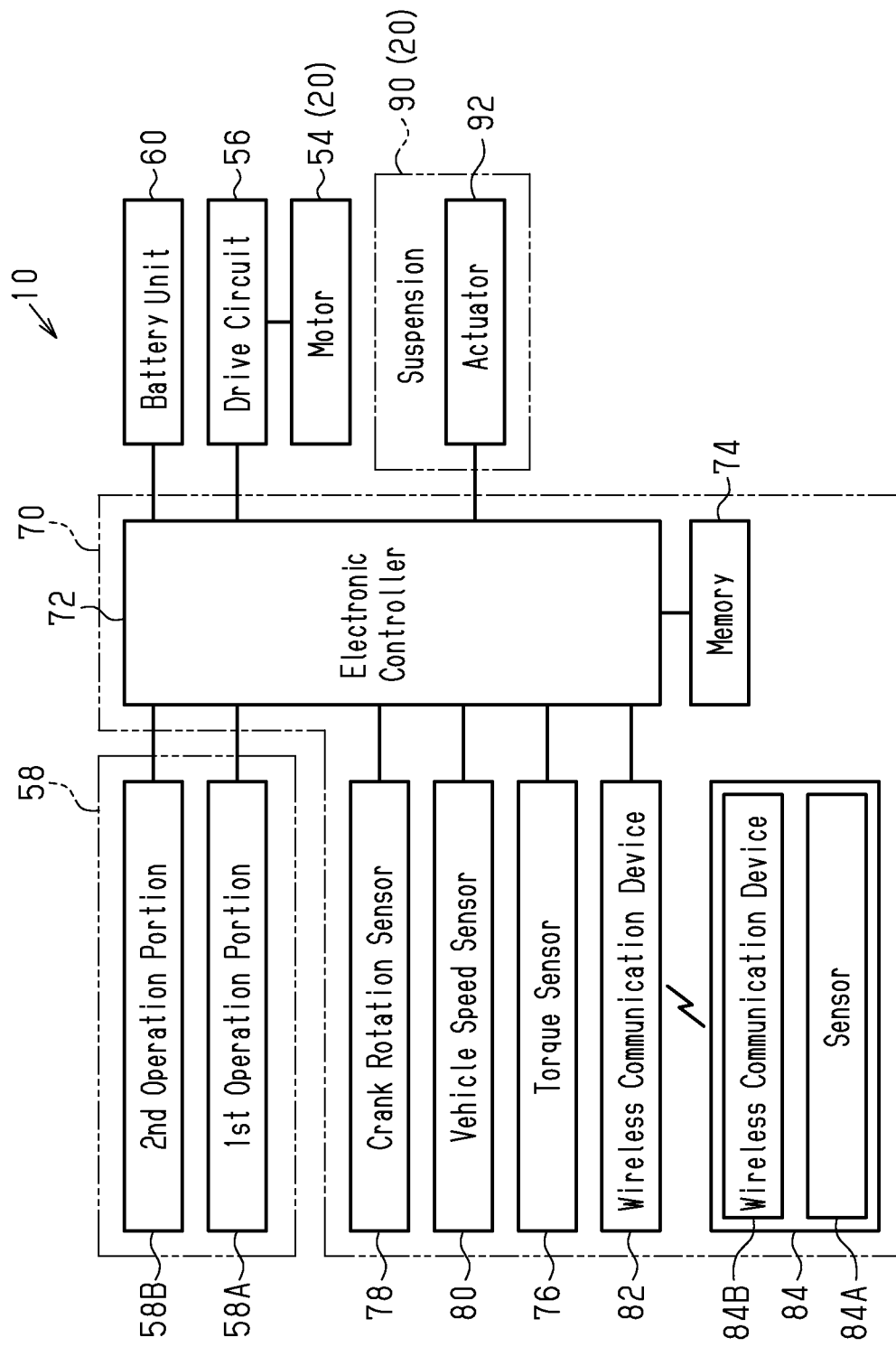
FIG. 18 is a block diagram in accordance with the electric configuration of a bicycle control device in accordance with a fourth embodiment.
Figure 19:
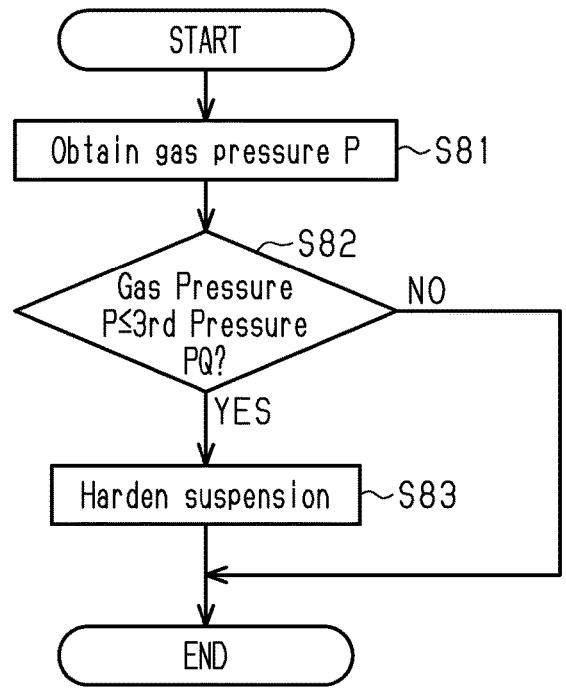
FIG. 19 is a flowchart in accordance with suspension adjustment control executed by the electronic controller of FIG. 18.

As shown in FIG. 18, the electric component 20 of the bicycle 10 includes the suspension 90. The suspension 90 includes an actuator 92. The suspension 90 is configured so that the hardness of the suspension 90 is changeable by the actuator 92. The actuator 92 is provided on the suspension 90 to control the opening and closing of a valve that adjusts the hardness of the suspension 90. The suspension 90 includes at least one of a front suspension and a rear suspension. The specific mechanism of the front suspension and the rear suspension is the same as that of a typical suspension. Thus, the mechanism will not be described in detail.

The electronic controller 72 controls the suspension 90 in accordance with the gas pressure P. In a case where the gas pressure P is less than or equal to a third pressure PQ, the electronic controller 72 hardens the suspension 90 compared to a case where the gas pressure P is greater than the third pressure PQ.

The control for adjusting the suspension 90 will now be described with reference to FIG. 19. In a state were the bicycle control device 70 is activated, the electronic controller 72 executes the adjustment control in predetermined cycles. The electronic controller 72 terminates the adjustment control in a case where at least one predetermined condition is satisfied. The predetermined condition is satisfied in a case where the bicycle control device 70 is deactivated.

The electronic controller 72 obtains the gas pressure P in step S81 and proceeds to step S82. In step S82, the electronic controller 72 determines whether or not the gas pressure P obtained in step S81 is less than or equal to the third pressure PQ. In a case where the electronic controller 72 determines that the gas pressure P is less than or equal to the third pressure PQ, the electronic controller 72 proceeds to step S83 to control the actuator 92 so that the suspension 90 is hardened and then ends the process. After a predetermined cycle, the electronic controller 72 again starts the process from step S81. In a case where the electronic controller 72 determines in step S82 that the gas pressure P is greater than the third pressure PQ, the electronic controller 72 ends the process. After a predetermined cycle, the electronic controller 72 again starts the process from step S81.

Modifications

The above description illustrates embodiments of a bicycle control device according to the present invention and is not intended to be restrictive. The embodiments of the bicycle control device according to the present invention can be, for example, modified as follows. Further, two or more of the modifications can be combined. In the following modifications, the same reference characters are given to those elements that are the same as the corresponding elements of the embodiments. Such elements will not be described in detail.

In the assist mode of the first embodiment, the electronic controller 72 can control the motor 54 in accordance with the change amount of the gas pressure P. For example, in step S23 of FIG. 7, the electronic controller 72 controls the motor 54 so that the assist ratio R is changed accordance with an increase amount of the gas pressure P. In a case where the increase amount of the gas pressure P increases, the electronic controller 72 increases the assist ratio R. The electronic controller 72 also controls the motor 54 so that the assist ratio R is changed in accordance with a decrease amount of the gas pressure P. In a case where the decrease amount increases, the electronic controller 72 increases the assist ratio R. In this modification, the electronic controller 72 can control the motor 54 in accordance with a change amount from the reference value PXA, which is stored in the memory 74. Alternatively, the electronic controller 72 can control the motor 54 in accordance with a change amount from the gas pressure P obtained at a time of activating the bicycle control device 70. Alternatively, the electronic controller 72 can control the motor 54 in accordance with a change amount from the gas pressure P obtained at a time of performing a particular operation on the user actuator 58.

In the walk mode of the first embodiment, the electronic controller 72 can control the motor 54 in accordance with the change amount of the gas pressure P. For example, in step S33 of FIG. 10, the motor 54 is controlled in accordance with the change amount of the gas pressure P. In the walk mode, the electronic controller 72 changes the output TX of the motor 54 in accordance with an increase amount of the gas pressure P. In a case where the increase amount increases, the electronic controller 72 increases the output TX of the motor 54. Alternatively, for example, in the walk mode, the electronic controller 72 can change an increase rate of the output TX of the motor 54 at a time of starting to assist in waking the bicycle 10 in accordance with an increase amount of the gas pressure P. Alternatively, for example, in a case where the increase amount of the gas pressure P increases, the electronic controller 72 can decrease the increase rate of the output TX of the motor 54 at a time of starting to assist in walking the bicycle 10. Alternatively, for example, in the walk mode, the electronic controller 72 can change the change rate of the rotational speed N of the motor 54 at a time of changing the vehicle speed V of the bicycle 10 in accordance with the increase amount of the gas pressure P. In a case where the increase amount of the gas pressure P increases, the electronic controller 72 decreases the change rate of the rotational speed N of the motor 54 at a time of changing the vehicle speed V of the bicycle 10. In this modification, the electronic controller 72 can control the motor 54 in accordance with a reference value PWA, which is stored in the memory 74. Alternatively, the electronic controller 72 can control the motor 54 in accordance with the change amount of the gas pressure P at a time of activating the bicycle control device 70. Alternatively, the electronic controller 72 can control the motor 54 in accordance with the change amount from the gas pressure P obtained at a time of performing a particular operation on the user actuator 58.

Figure 20:
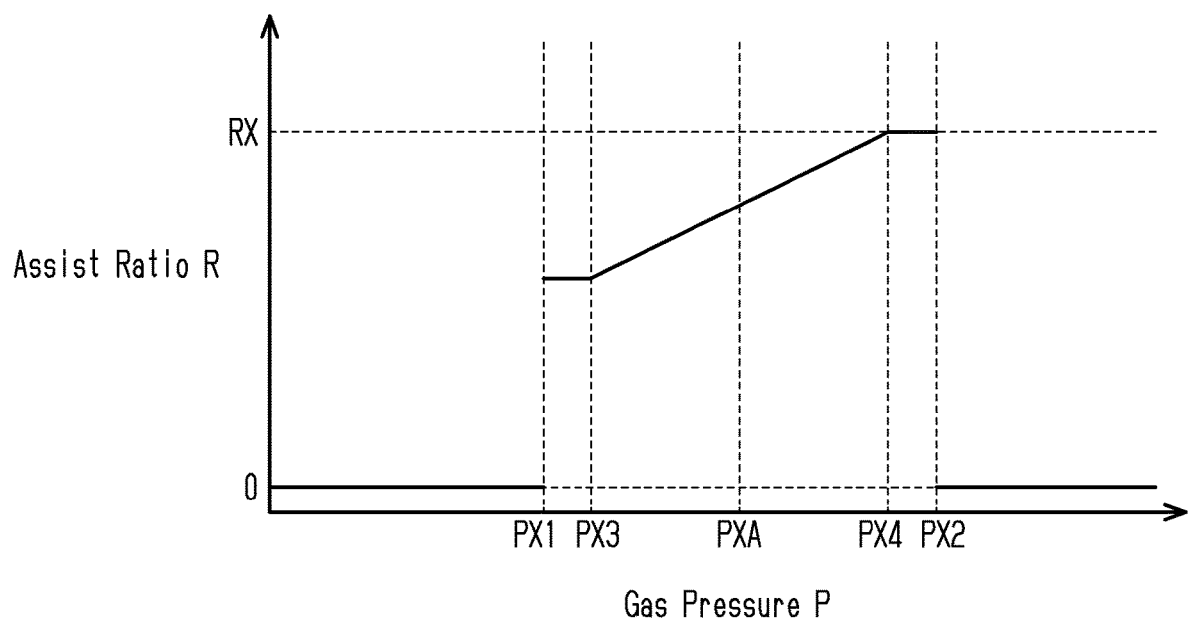
FIG. 20 is a fifth map in accordance with a first modification of the first map of FIG. 5.
Figure 21:
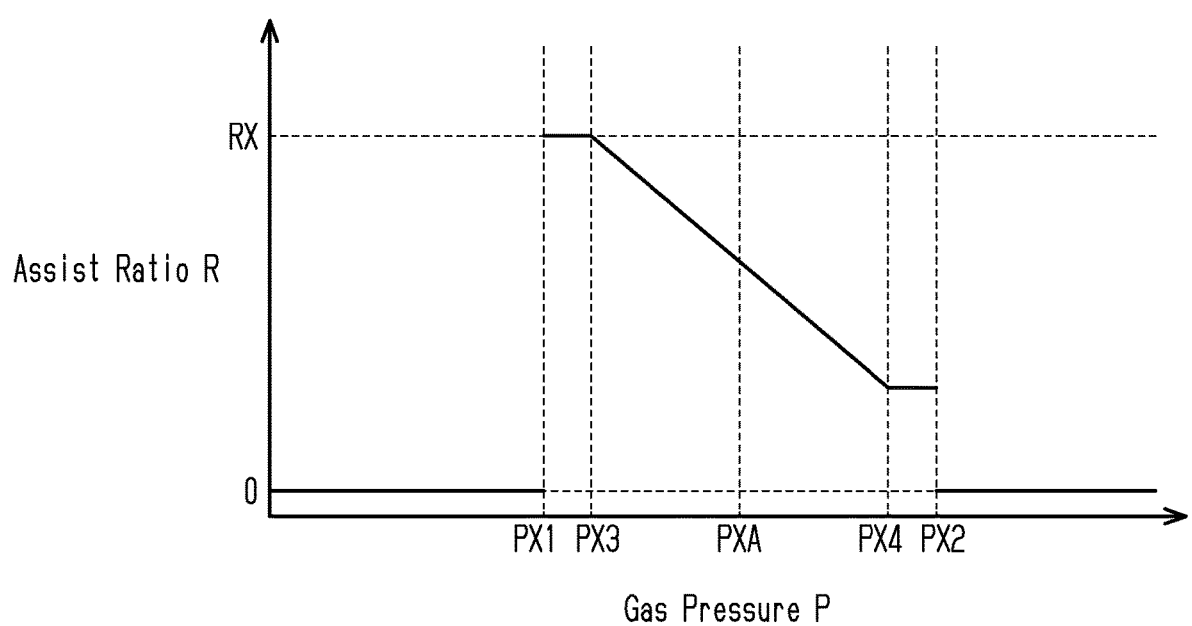
FIG. 21 is a sixth map in accordance with a second modification of the first map of FIG. 5.

The first map of the first embodiment, which is shown in FIG. 5, can be changed to a fifth map that is shown in FIG. 20. In the fifth map, the assist ratio R increases as the gas pressure P is increased in the range from the third pressure PX3 to the fourth pressure PX4. In this case, the assist ratio R can be increased in a linear manner, a curvilinear manner, or a stepped manner as the gas pressure P is increased in the range from the third pressure PX3 to the fourth pressure PX4. Alternatively, the first map of the first embodiment, which is shown in FIG. 5, can be changed to a sixth map that is shown in FIG. 21. In the sixth map, the assist ratio R is decreased as the gas pressure P is increased in the range from the third pressure PX3 to the fourth pressure PX4. In this case, the assist ratio R can be decreased in a linear manner, a curvilinear manner, or a stepped manner as the gas pressure P is increased in the range from the third pressure PX3 to the fourth pressure PX4.

Figure 14:
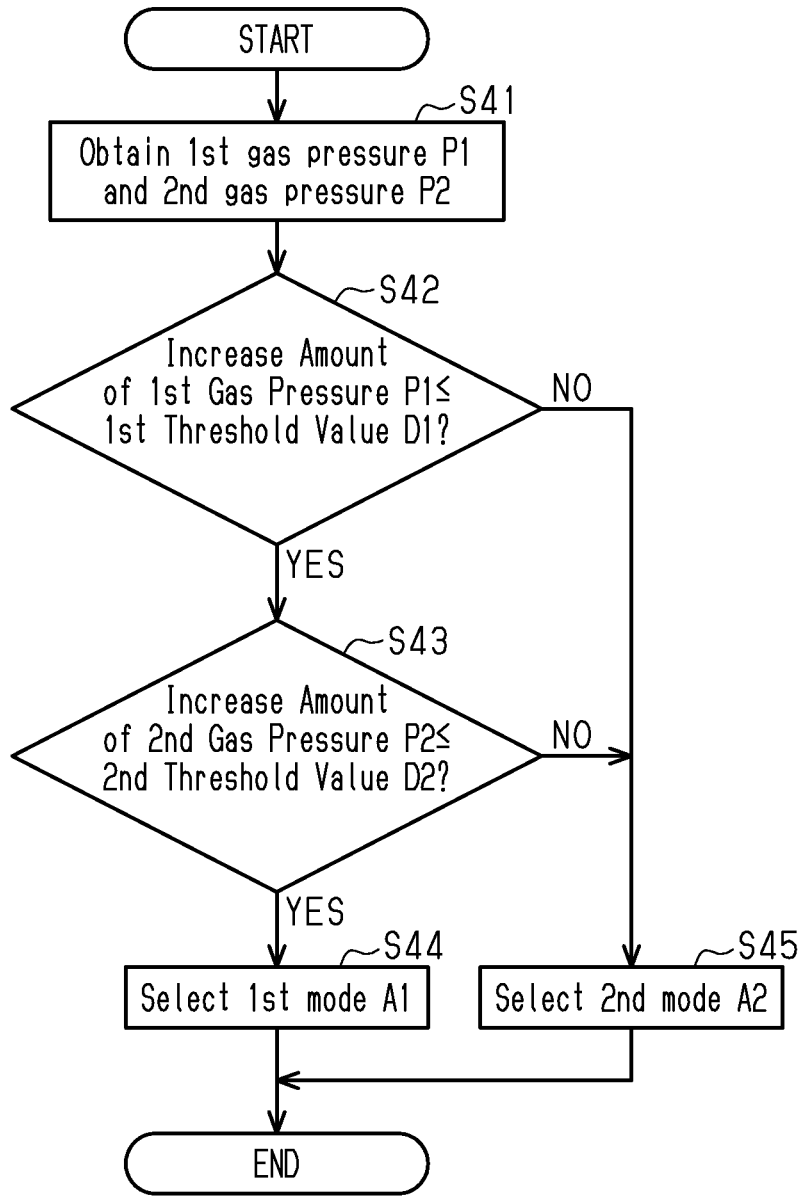
FIG. 14 is a flowchart in accordance with mode switching control executed by the electronic controller of FIG. 13 in the assist mode.

One of step S43 and step S44, which are shown in FIG. 14, can be omitted from the second embodiment. In the case of omitting step S44, in a case where the increase amount of the first gas pressure P1 is less than or equal to the first threshold value D1, the electronic controller 72 controls the motor 54 in the first mode A1. In a case where the increase amount of the first gas pressure P1 is greater than the first threshold value D1, the electronic controller 72 controls the motor 54 in the second mode A2. In the case of omitting step S43, in a case where the increase amount of the second gas pressure P2 is less than or equal to the second threshold value D2, the electronic controller 72 controls the motor 54 in the first mode A1. In a case where the increase amount of the second gas pressure P2 is greater than the second threshold value D2, the electronic controller 72 controls the motor 54 in the second mode A2.

Figure 15:
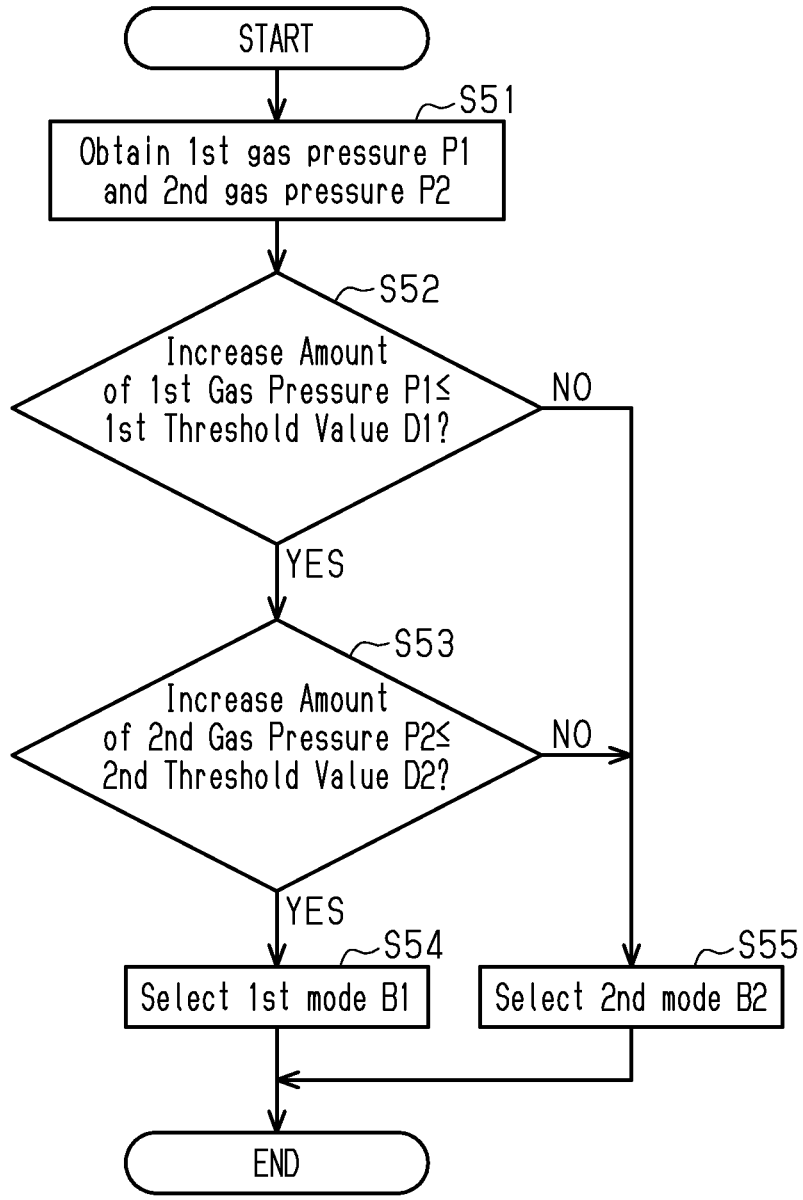
FIG. 15 is a flowchart in accordance with mode switching control executed by the electronic controller of FIG. 13 in the walk mode.

One of step S53 and step S54, which are shown in FIG. 15, can be omitted from the second embodiment. In the case of omitting step S54, in a case where the increase amount of the first gas pressure P1 is less than or equal to the first threshold value D1, the electronic controller 72 controls the motor 54 in the first mode B1. In a case where the increase amount of the first gas pressure P1 is greater than the first threshold value D1, the electronic controller 72 controls the motor 54 in the second mode B2. In the case of omitting step S53, in a case where the increase amount of the second gas pressure P2 is less than or equal to the second threshold value D2, the electronic controller 72 controls the motor 54 in the first mode B1. In a case where the increase amount of the second gas pressure P2 is greater than the second threshold value D2, the electronic controller 72 controls the motor 54 in the second mode B2.

In the second embodiment, the electronic controller 72 can switch between a third mode and a fourth mode based on the increase amount of the first gas pressure P1 and the increase amount of the second gas pressure P2. In the third mode, the electric component 20 is not controlled in accordance with the gas pressure P. In the fourth mode, the electric component 20 is controlled in accordance with the gas pressure P. For example, in a case where the fourth mode is executed in the assist mode, the motor 54 is controlled using the first map, shown in FIG. 5, or the second map, shown in FIG. 6, of the first embodiment. For example, in a case where the fourth mode is executed in the walk mode, the motor 54 is controlled using the third map, shown in FIG. 8, and the fourth map, shown in FIG. 9, of the first embodiment. Charts 1 to 3 show examples of the relationships between the increase amount of the first gas pressure P1 and the second gas pressure P2 and the selection of the third mode and the fourth embodiment. Preferably, chart 1 is applied to a bicycle 10 that includes a loading mechanism located at the side of the front wheel 28. Preferably, chart 2 is applied to a bicycle 10 that includes a loading mechanism located at the side of the rear wheel 30. Preferably, chart 3 is applied to a bicycle 10 that includes loading mechanisms located at the side of each of the front wheel 28 and the rear wheel 30.

| Chart 1 | | | |
|---|---|---|---|
| | | 2nd Gas Pressure P2 Increase Amount | |
| | | ≥4th Threshold Value D4 | <4th Threshold Value D4 |
| 1st Gas Pressure P1 Increase Amount | ≥3rd Threshold Value D3 | 4th Mode | 4th Mode |
| | <3rd Threshold Value D3 | 3rd Mode | 3rd Mode |

| Chart 2 | | | |
|---|---|---|---|
| | | 2nd Gas Pressure P2 Increase Amount | |
| | | ≥4th Threshold Value D4 | <4th Threshold Value D4 |
| 1st Gas Pressure P1 Increase Amount | ≥3rd Threshold Value D3 | 4th Mode | 3rd Mode |
| | <3rd Threshold Value D3 | 4th Mode | 3rd Mode |

| Chart 3 | | | |
|---|---|---|---|
| | | 2nd Gas Pressure P2 Increase Amount | |
| | | ≥4th Threshold Value D4 | <4th Threshold Value D4 |
| 1st Gas Pressure P1 Increase Amount | ≥3rd Threshold Value D3 | 4th Mode | 4th Mode |
| | <3rd Threshold Value D3 | 4th Mode | 3rd Mode |

The second gas pressure detection device 88 can be omitted from the modification shown in chart 1. In this case, the electronic controller 72 selects one of the third mode and the fourth mode based on only the first gas pressure P1.

The first gas pressure detection device 86 can be omitted from the modification shown in chart 2. In this case, the electronic controller 72 selects one of the third mode and the fourth mode based on only the second gas pressure P2.

In the third embodiment, in a case where the increase amount of the first gas pressure P1 is less than the increase amount of the second gas pressure P2, the electronic controller 72 can increase the assist ratio R compared to a case where the increase amount of the first gas pressure P1 is greater than the increase amount of the second gas pressure P2. One example of the case where the increase amount of the first gas pressure P1 is less than the increase amount of the second gas pressure P2 is uphill traveling. In such a case, the assist ratio R is increased to reduce the load on the rider.

In the control for driving the motor 54 in the walk mode of the third embodiment, the output TX of the motor 54 can be determined in accordance with the first gas pressure P1 and the second gas pressure P2 without using the vehicle speed V. For example, in step S72 of FIG. 17, the electronic controller 72 obtains the first gas pressure P1 and the second gas pressure P2. In step S73, the electronic controller 72 determines the output TX of the motor 54 in accordance with the first gas pressure P1 and the second gas pressure P2, which are obtained in step S72. More specifically, in a case where the increase amount of the first gas pressure P1 is greater than the increase amount of the second gas pressure P2, the electronic controller 72 reduces the output TX of the motor 54 compared to a case where the increase amount of the first gas pressure P1 is less than or equal to the increase amount of the second gas pressure P2.

In the control for driving the motor 54 in the assist mode of the third embodiment, the output TX of the motor 54 can be determined based on the first gas pressure P1 and the second gas pressure P2 without using the vehicle speed V. In the assist mode, in a case where the increase amount of the first gas pressure P1 is greater than the increase amount of the second gas pressure P2, the electronic controller 72 decreases the assist ratio R compared to a case where the increase amount of the first gas pressure P1 is less than or equal to the increase amount of the second gas pressure P2. For example, in step S62 of FIG. 16, the electronic controller 72 obtains the first gas pressure P1 and the second gas pressure P2. In step S63, the electronic controller 72 determines the assist ratio R in accordance with the first gas pressure P1 and the second gas pressure P2, which are obtained in step S62. More specifically, in a case where the increase amount of the first gas pressure P1 is greater than the increase amount of the second gas pressure P2, the electronic controller 72 decreases the assist ratio R. Alternatively, in the case where the increase amount of the first gas pressure P1 is greater than the increase amount of the second gas pressure P2, the electronic controller 72 determines that the output TX of the motor 54 is a value that is decreased by multiplying the output TX of the motor 54, which is determined based on the assist ratio R, by the correction coefficient. In a case where the increase amount of the first gas pressure P1 is less than or equal to the increase amount of the second gas pressure P2, the assist ratio R remains the same.

In the first to third embodiments, the electronic controller 72 of controls the electric component 20 in the assist mode and the walk mode in accordance with the gas pressure P. Instead, the electric component 20 can be controlled in only one of the assist mode and the walk mode in accordance with the gas pressure P.

In the fourth embodiment, the memory 74 can store at least one of a map, a table, and a relational expression that specify the gas pressure P and the hardness of the suspension 90 in advance. The hardness of the suspension 90 can be changed based on the map, the table, and the relational expression.

In the fourth embodiment, the first gas pressure detection device 86 and the second gas pressure detection device 88 of the second embodiment can be provided so as to detect the first gas pressure P1 and the second gas pressure P2. In this case, the suspension 90 can include a front suspension and a rear suspension. While the front suspension is controlled based on the first gas pressure P1, the rear suspension can be controlled based on the second gas pressure P2.

The electronic controller 72 of each embodiment can control the electric component 20 based on a value obtained by smoothing outputs of the gas pressure detection devices 84, 86 and 88. The smoothing includes at least one of a grading process, an arithmetic process for obtaining an average value of the gas pressures P, P1 and P2 during a predetermined period, and a process for eliminating deviated values through a filter or the like. The predetermined period is, for example, ten minutes.

The electronic controller 72 of each embodiment can control the electric component 20 in accordance with at least one of the pressure of the gas chamber 42A of the suspension 42 and the pressure of the gas chamber 44A of the adjustable seatpost 44 instead of or in addition to the gas pressure P of the tire 40. In a case where the electronic controller 72 controls the electric component 20 in accordance with the pressure of the gas chamber 42A of the suspension 42 instead of the gas pressure P of the tire 40, the pressure of the gas chamber 42A of the suspension 42 is detected by the gas pressure detection device 84. In this case, the gas pressure detection device 84 has a structure for detecting the pressure of the gas chamber 42A of the suspension 42. In a case where the electronic controller 72 controls the electric component 20 based on the pressure of the gas chamber 44A of the adjustable seatpost 44, the gas pressure detection device 84 detects the pressure of the gas chamber 44A of the adjustable seatpost 44 instead of the gas pressure P of the tire 40. In this case, the gas pressure detection device 84 has a structure for detecting the pressure of the gas chamber 44A of the adjustable seatpost 44. The electronic controller 72 can control the electric component 20 using two or more of the gas pressure P of the tire 40, the pressure of the gas chamber 42A of the suspension 42, and the pressure of the gas chamber 42A of the adjustable seatpost 44. The electronic controller 72 can perform different controls on the electric component 20 in accordance with the kind and the combination of the bicycle components 18 used for controlling the electric component 20. In a case where the electronic controller 72 controls the electric component 20 in accordance with two of the gas pressure P of the tire 40, the pressure of the gas chamber 42A of the suspension 42, and the pressure of the gas chamber 44A of the adjustable seatpost 44, it is preferred that a three-dimensional map is used.

The electronic controller 72 of each embodiment can control the electric component 20 in accordance with the gas pressures P, P1 and P3 that are stored by operation of the user instead of the cyclically detected gas pressures P, P1 and P3. In this case, for example, before starting to move the bicycle 10, the user operates, for example, an operation portion so that the electronic controller 72 stores the present gas pressures P, P1 and P3 in the memory 74. The electronic controller 72 controls the electric component 20 in accordance with the gas pressures P, P1 and P3 that are stored in the memory 74.

The gas pressure detection device 84 can be omitted from each embodiment. In this case, for example, before starting to move the bicycle 10, the user measures gas pressure and operates, for example, an operation portion to store the gas pressure in the memory 74. The electronic controller 72 controls the electric component 20 in accordance with the gas pressure that is stored in the memory 74.

The seatpost 22C of the bicycle 10 can include an electric adjustable seatpost. In this case, the electric component 20 includes the electric adjustable seatpost. The electronic controller 72 can control an actuator of the electric adjustable seatpost in accordance with the gas pressure P. The electric adjustable seatpost can be, for example, a typical hydraulic adjustable seatpost including a valve configured to be opened and closed by the actuator. In another example, the electric adjustable seatpost can have a mechanism for adjusting the length of the seatpost with output of a motor. For example, in a case where the gas pressure detection device 84 detects the gas pressure P of the gas chamber 48C of the rear tire 48, in a case where the gas pressure P is increased, the electronic controller 72 controls the actuator to lift the seatpost 22C.

Instead of or in addition to the motor 54 of each embodiment, the bicycle 10 can include a motor provided on the rear wheel 30 or in the vicinity of the crank 32. In a case where a motor is provided on the rear wheel 30, the motor is provided on a hub of the rear wheel 30 to transmit rotation to the rear wheel 30. In a case where a motor is provided in the vicinity of the crank 32, it is preferred that the front rotary body 36 of the drive mechanism 16 is coupled to the crankshaft 32A via a first one-way clutch (not shown). The first one-way clutch is configured to allow for forward rotation of the front rotary body 36 in a case where the crank 32 is rotated forward, and prohibit rearward rotation of the front rotary body 36 in a case where the crank 32 is rotated rearward. The first one-way clutch may be omitted. Preferably, the output of the motor 54 is applied to a power transmission path extending between the crankshaft 32A and the front rotary body 36. The motor 54 and the crankshaft 32A are supported by a housing provided on the frame 22.

In each embodiment, in a case where the gas pressure P is less than or equal to the first pressure PX1, greater than or equal to the second pressure PX2, less than or equal to the first pressure PY1, or greater than or equal to the second pressure PY2, the electronic controller 72 can set the assist ratio R to a predetermined value that is greater than zero. In each embodiment, in a case where the gas pressure P is less than or equal to the first pressure PZ1, greater than or equal to the second pressure PZ2, less than or equal to the first pressure PW1, or greater than or equal to the second pressure PW2, the electronic controller 72 can set the output TX of the motor 54 to a predetermined value that is greater than zero.

What is claimed is:

1. A bicycle control device comprising:
an electronic controller that receives data indicative of a detected gas pressure of a tire provided to a bicycle, the tire being configured to maintain a gas in a compressed state; and
a gas pressure detection device directly attached to a valve of the tire, the gas pressure detection device including
a sensor that detects the gas pressure of the tire; and
a wireless communication device configured to perform wireless communication with the electronic controller,
the gas pressure detection device being spaced radially outward from a rotational axis of the tire.

2. The bicycle control device according to claim 1, wherein
the gas pressure detection device includes a battery to power the sensor and the wireless communication device.

3. The bicycle control device according to claim 1, wherein
the tire includes a gas chamber configured to maintain the gas in the compressed state, the sensor being in direct fluid communication with the gas chamber.

4. A bicycle control device comprising:
an electronic controller that receives data indicative of a detected gas pressure of a tire provided to a bicycle, the tire being configured to maintain a gas in a compressed state; and
a sensor that detects the gas pressure of the tire; and
a wireless communication device disposed in the vicinity of a rim of the tire and configured to perform wireless communication with the electronic controller,
the sensor being configured to output a first signal corresponding to a detected gas pressure to the wireless communication device,
the wireless communication device being configured to output a second signal to the electronic controller corresponding to the detected gas pressure, and
the wireless communication device being disposed closer to the rim of the tire than to a rotation axis of the tire.

5. A bicycle control device comprising:
an electronic controller that receives data indicative of a detected gas pressure of a tire provided to a bicycle, the tire being configured to maintain a gas in a compressed state; and
a sensor that detects the gas pressure of the tire; and
a wireless communication device disposed in the vicinity of a rim of the tire and configured to perform wireless communication with the electronic controller,
the sensor being configured to output a first signal corresponding to a detected gas pressure to the wireless communication device,
the wireless communication device being configured to output a second signal to the electronic controller corresponding to the detected gas pressure, and
the sensor is being directly attached to a valve of the tire.

6. A bicycle control device comprising:
an electronic controller that receives data indicative of a detected gas pressure of a tire provided to a bicycle, the tire being configured to maintain a gas in a compressed state; and
a sensor that detects the gas pressure of the tire; and
a wireless communication device disposed in the vicinity of a rim of the tire and configured to perform wireless communication with the electronic controller,
the sensor being configured to output a first signal corresponding to a detected gas pressure to the wireless communication device,
the wireless communication device being configured to output a second signal to the electronic controller corresponding to the detected gas pressure, and
the wireless communication device is being spaced radially outward from a rotational axis of the tire.

7. The bicycle control device according to claim 4, wherein
the tire includes a gas chamber configured to maintain the gas in the compressed state, the sensor being in direct fluid communication with the gas chamber.

8. A bicycle control device comprising:
an electronic controller that receives data indicative of a detected gas pressure of a gas chamber of a bicycle component provided to a bicycle, the gas chamber of the bicycle component being configured to maintain a gas in a compressed state;
a sensor that detects the gas pressure of the bicycle component; and
a wireless communication device configured to perform wireless communication with the electronic controller,
the sensor being configured to output a first signal corresponding to a detected gas pressure to the wireless communication device,
the wireless communication device being configured to output a second signal to the electronic controller corresponding to the detected gas pressure, and
the bicycle component including at least one of a suspension and an adjustable seatpost.

* * * * *